United States Patent
Merzon

(10) Patent No.: US 9,335,789 B2
(45) Date of Patent: May 10, 2016

(54) SYSTEM AND APPARATUS FOR MOUNTING A HANDHELD ELECTRONIC DEVICE

(71) Applicant: Adam Merzon, Greenwich, CT (US)

(72) Inventor: Adam Merzon, Greenwich, CT (US)

( * ) Notice: Subject to any disclaimer, the term of this patent is extended or adjusted under 35 U.S.C. 154(b) by 0 days.

(21) Appl. No.: 14/274,079

(22) Filed: May 9, 2014

(65) Prior Publication Data

US 2015/0136933 A1   May 21, 2015

Related U.S. Application Data

(60) Provisional application No. 61/822,045, filed on May 10, 2013.

(51) Int. Cl.

| | |
|---|---|
| *B65D 85/00* | (2006.01) |
| *G06F 1/16* | (2006.01) |
| *F16M 11/04* | (2006.01) |
| *F16M 11/10* | (2006.01) |
| *F16M 13/00* | (2006.01) |
| *F16M 13/04* | (2006.01) |

(52) U.S. Cl.
CPC ........... *G06F 1/1626* (2013.01); *F16M 11/041* (2013.01); *F16M 11/10* (2013.01); *F16M 13/00* (2013.01); *F16M 13/04* (2013.01)

(58) Field of Classification Search
CPC ............. F16M 11/041; F16M 2200/02; A45C 2011/002; A45F 2200/0525
See application file for complete search history.

(56) References Cited

U.S. PATENT DOCUMENTS

| | | | | |
|---|---|---|---|---|
| 4,527,760 A * | 7/1985 | Salacuse | ................... | A47K 1/09 24/DIG. 53 |
| 5,181,774 A * | 1/1993 | Lane | ........................... | B62J 6/02 224/421 |
| 5,604,958 A * | 2/1997 | Anscher | ............... | A45C 7/0086 224/197 |
| 5,688,030 A * | 11/1997 | McAnally | .............. | F16M 11/20 248/500 |
| 6,752,299 B2 * | 6/2004 | Shetler | ....................... | A45F 5/02 224/197 |
| 7,513,472 B2 * | 4/2009 | Yang | ..................... | F16M 11/041 224/197 |
| 8,149,194 B2 * | 4/2012 | Wu | ......................... | F16M 11/00 345/87 |
| 8,205,847 B2 * | 6/2012 | Dorris | ..................... | F16M 11/04 248/222.52 |
| 8,613,379 B2 * | 12/2013 | Lee | .......................... | B62J 11/00 224/282 |

(Continued)

*Primary Examiner* — Bradley Duckworth
(74) *Attorney, Agent, or Firm* — Jack Schwartz & Associates, PLLC

(57) ABSTRACT

A device for selectively and releasably mounting a handheld electronic device to a surface. The device includes a mounting plate and a base plate. The mounting plate includes a top surface having a female connector. The mounting plate may be secured to the surface. Alternatively, the mounting plate may include a rigid member extending around a recess through the surface. The base plate receives the handheld electronic device within a first side thereof and includes a male connector spaced and extending from a side of the base plate opposite the first side. The male connector has a size and shape similar to the size and shape of the recess. Insertion of the male connector into the recess and rotation of the male connector to be misaligned with the recess causes the base plate and handheld electronic device to be releasably locked to the mounting plate. The male connector on the base plate or the mounting plate may also be used detached from a surface as a handle for holding the electronic device when in use.

5 Claims, 49 Drawing Sheets

(56) References Cited

U.S. PATENT DOCUMENTS

| | | | | |
|---|---|---|---|---|
| 8,887,902 | B1* | 11/2014 | Liu | G06F 1/1628 206/320 |
| 8,941,989 | B2* | 1/2015 | Pollex | F16M 11/041 248/418 |
| 8,960,618 | B2* | 2/2015 | Chen | F16M 13/02 248/121 |
| 8,979,048 | B2* | 3/2015 | Tschann | B64D 43/00 224/545 |
| 9,027,892 | B2* | 5/2015 | Boer | B60R 11/0235 248/222.52 |
| 2006/0112522 | A1* | 6/2006 | Shannon | A45F 5/00 24/3.12 |
| 2006/0237495 | A1* | 10/2006 | Chen | A45F 5/02 224/197 |
| 2009/0108037 | A1* | 4/2009 | Liu | A45F 5/02 224/199 |
| 2013/0206942 | A1* | 8/2013 | Trotsky | F16M 11/041 248/274.1 |
| 2013/0221189 | A1* | 8/2013 | Kubin | F16M 13/04 248/683 |
| 2014/0028243 | A1* | 1/2014 | Rayner | G06F 1/163 320/103 |
| 2014/0221058 | A1* | 8/2014 | Jand | H04B 1/3888 455/575.8 |
| 2014/0360893 | A1* | 12/2014 | Whitten | A45C 11/00 206/45.2 |
| 2015/0041622 | A1* | 2/2015 | Mulhern | F16M 11/041 248/688 |
| 2015/0050077 | A1* | 2/2015 | Huang | F16B 21/125 403/322.1 |
| 2015/0144755 | A1* | 5/2015 | Chien | F16M 13/04 248/231.81 |
| 2015/0285432 | A1* | 10/2015 | Johnson | F16M 13/022 248/476 |
| 2015/0301561 | A1* | 10/2015 | Carnevali | G06F 1/1628 455/575.8 |

* cited by examiner

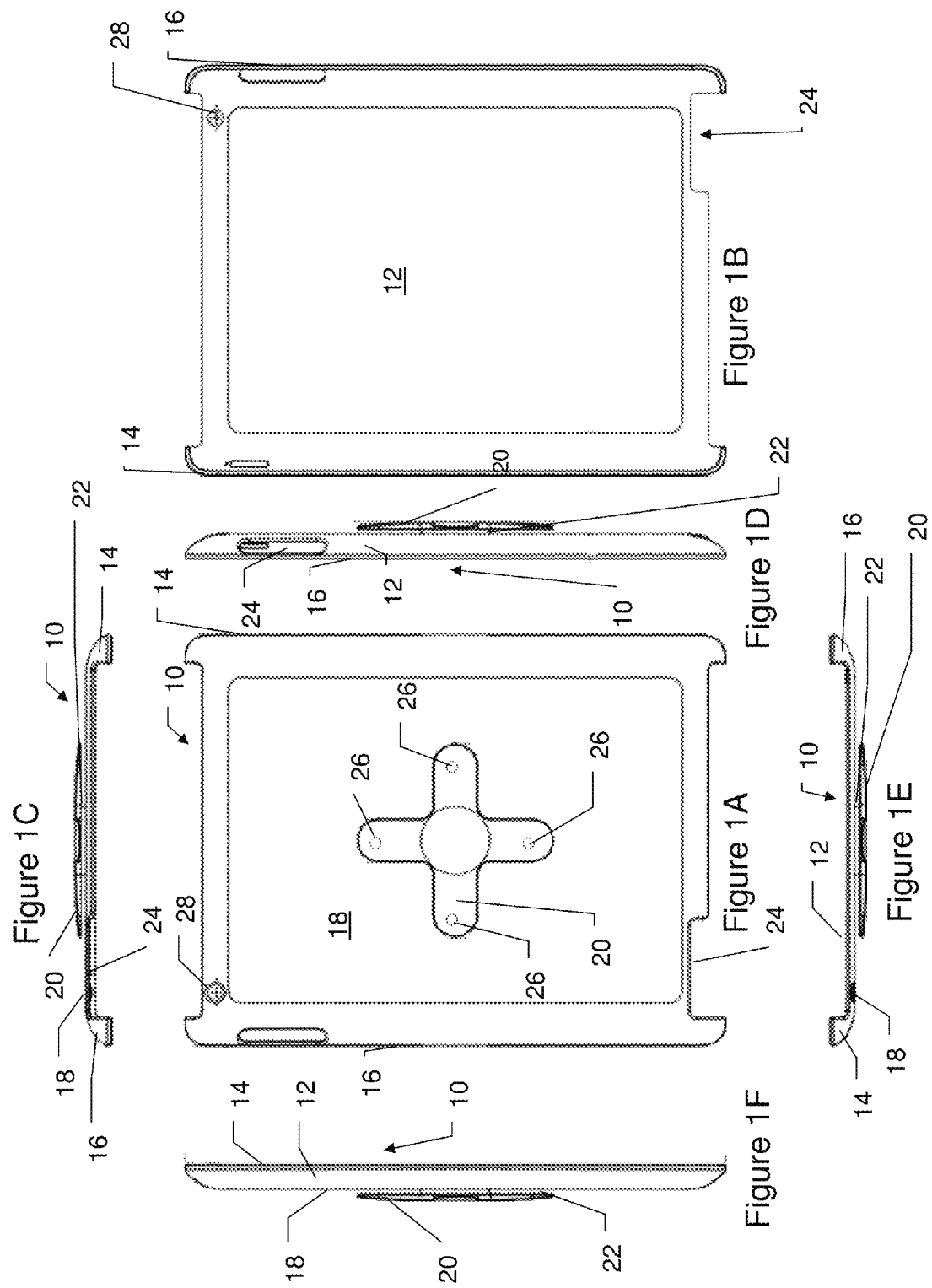

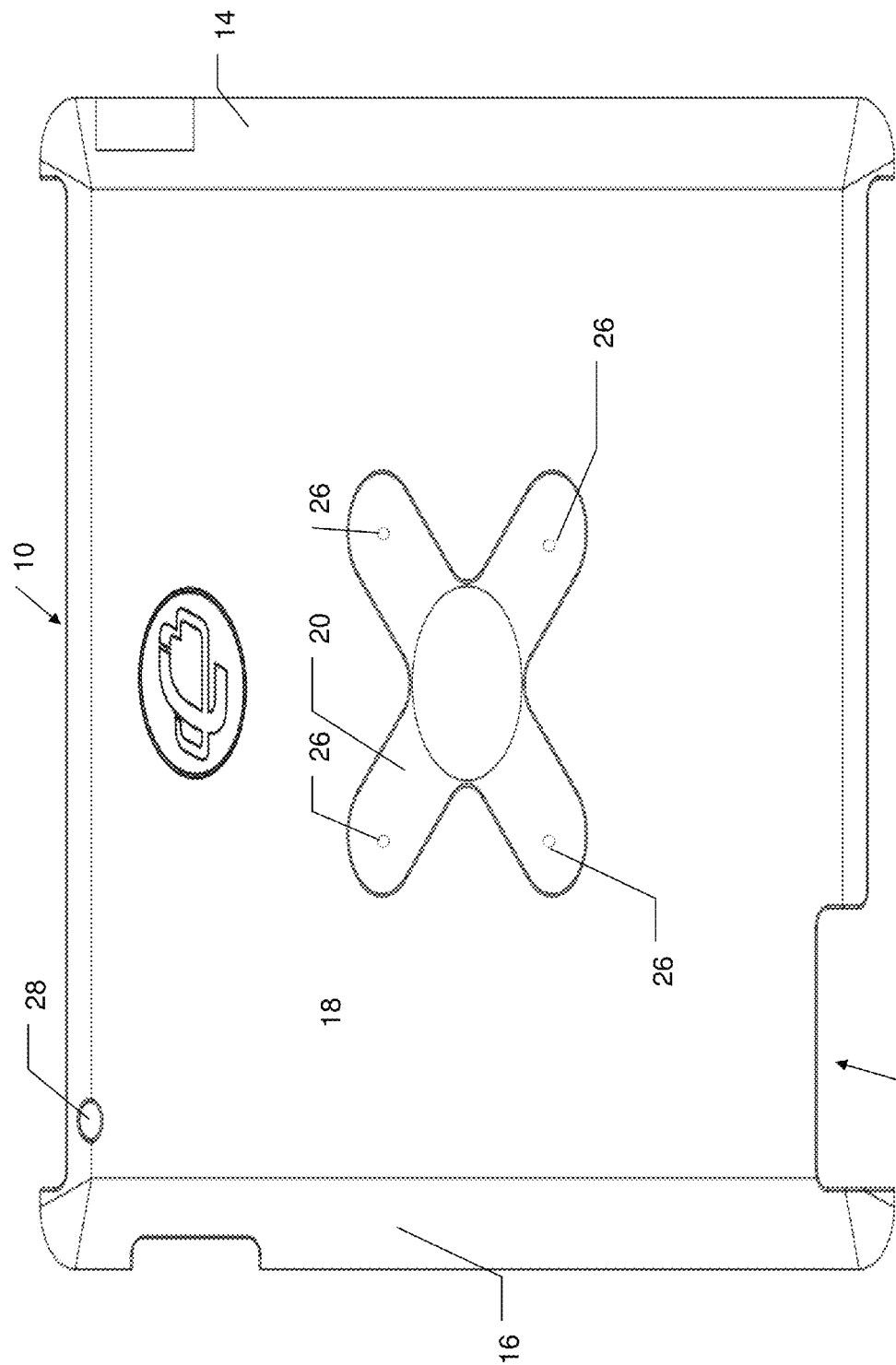

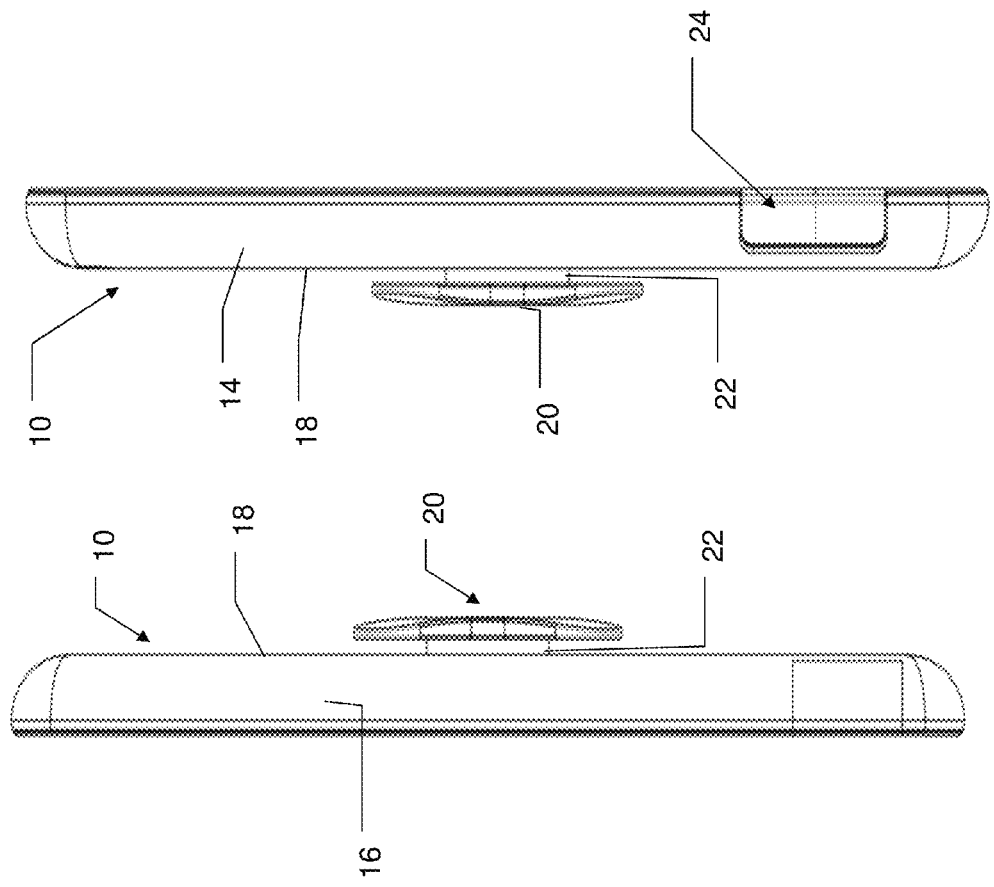
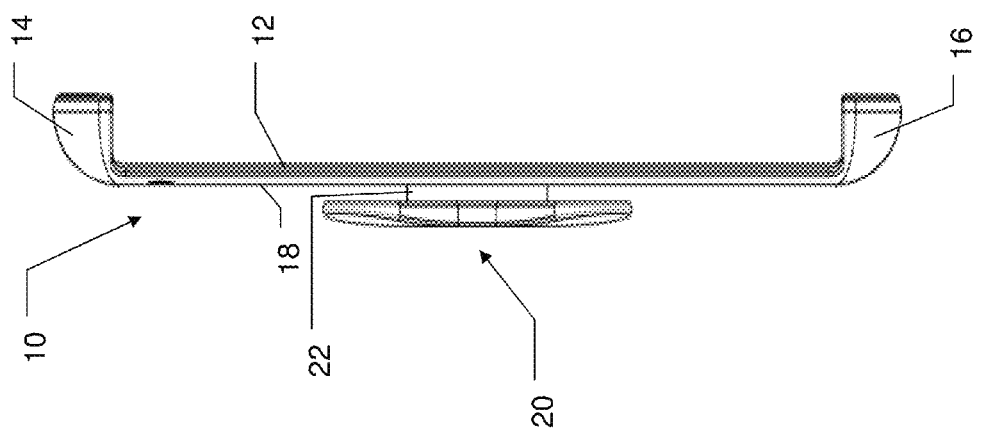

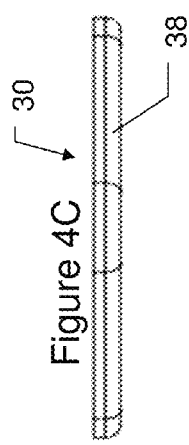
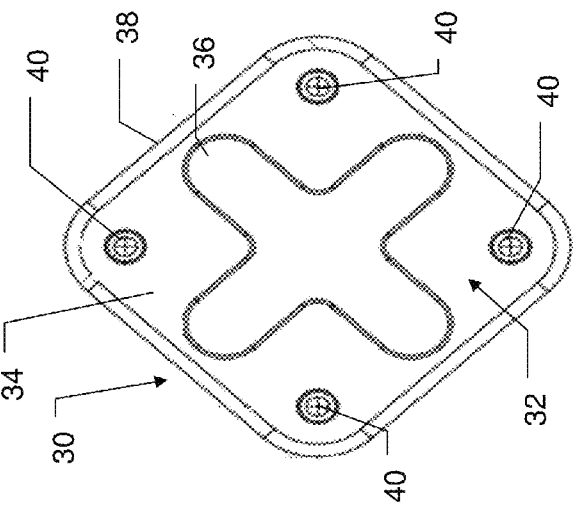
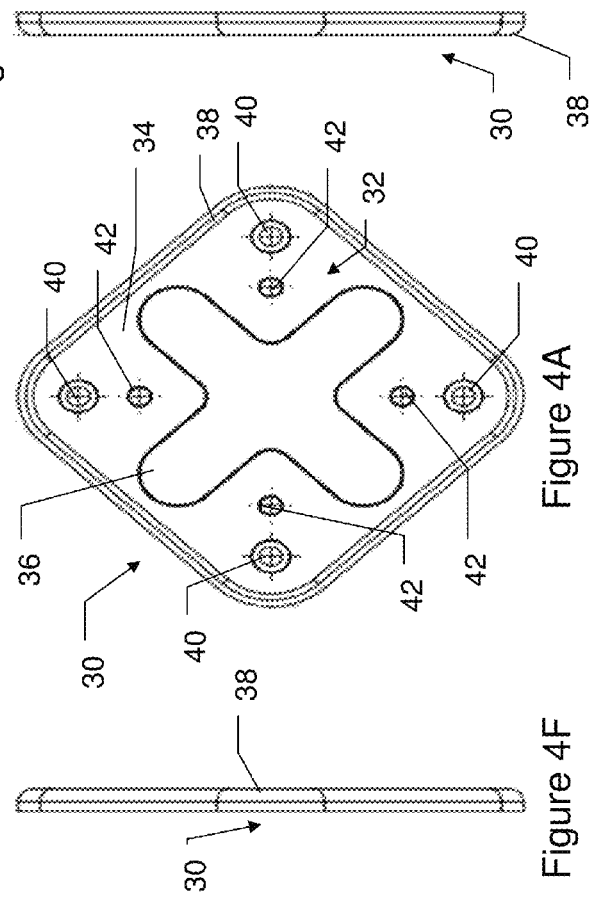
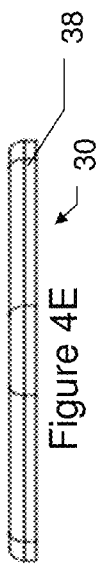

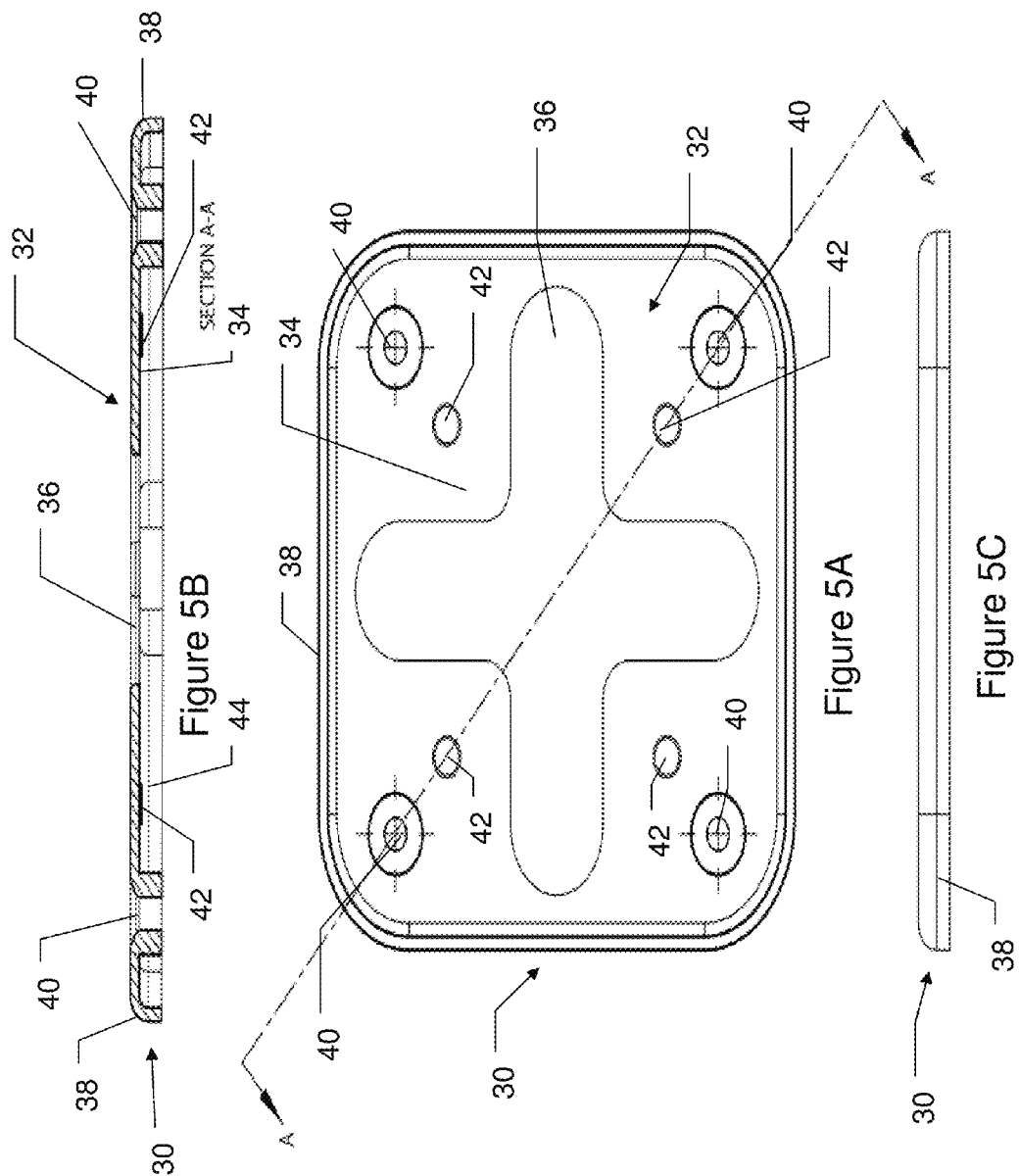

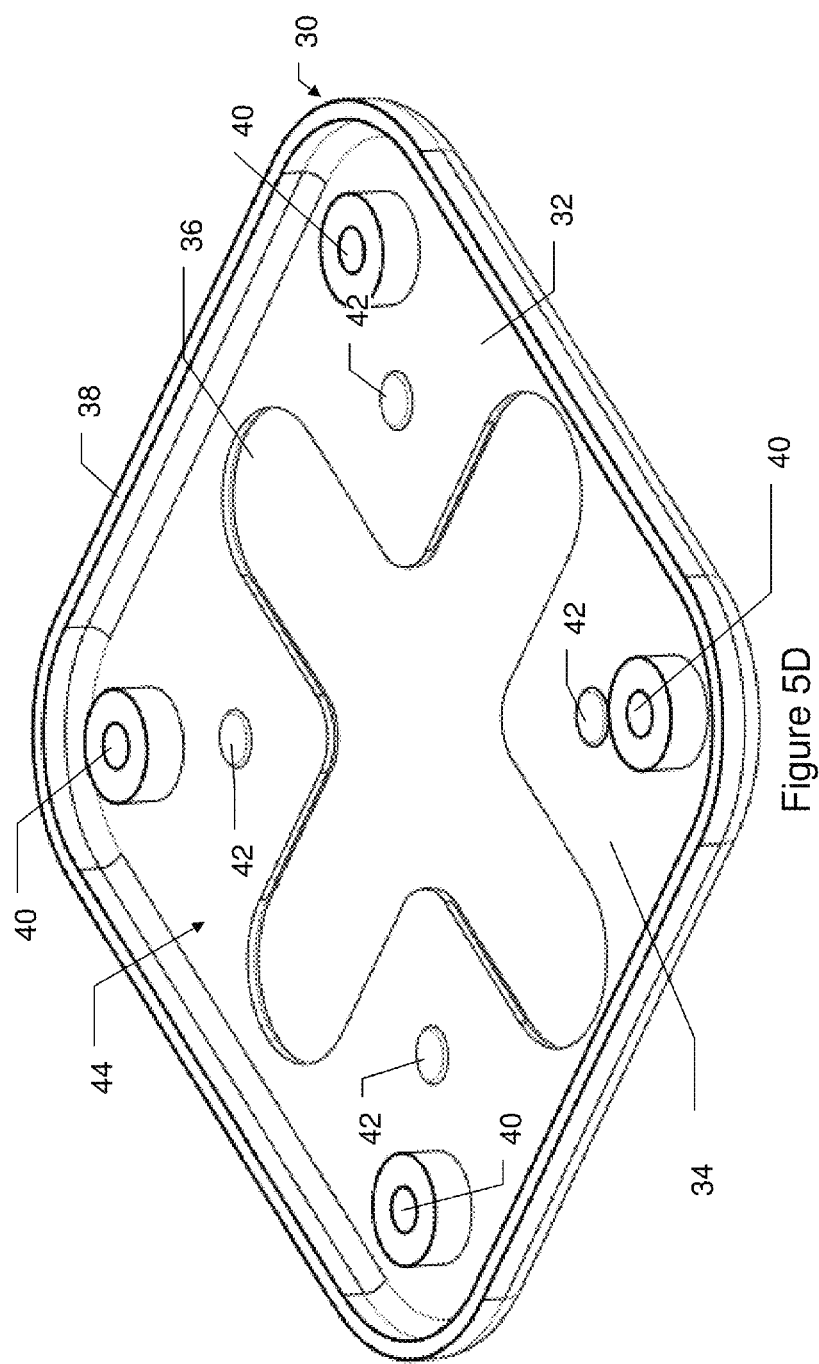

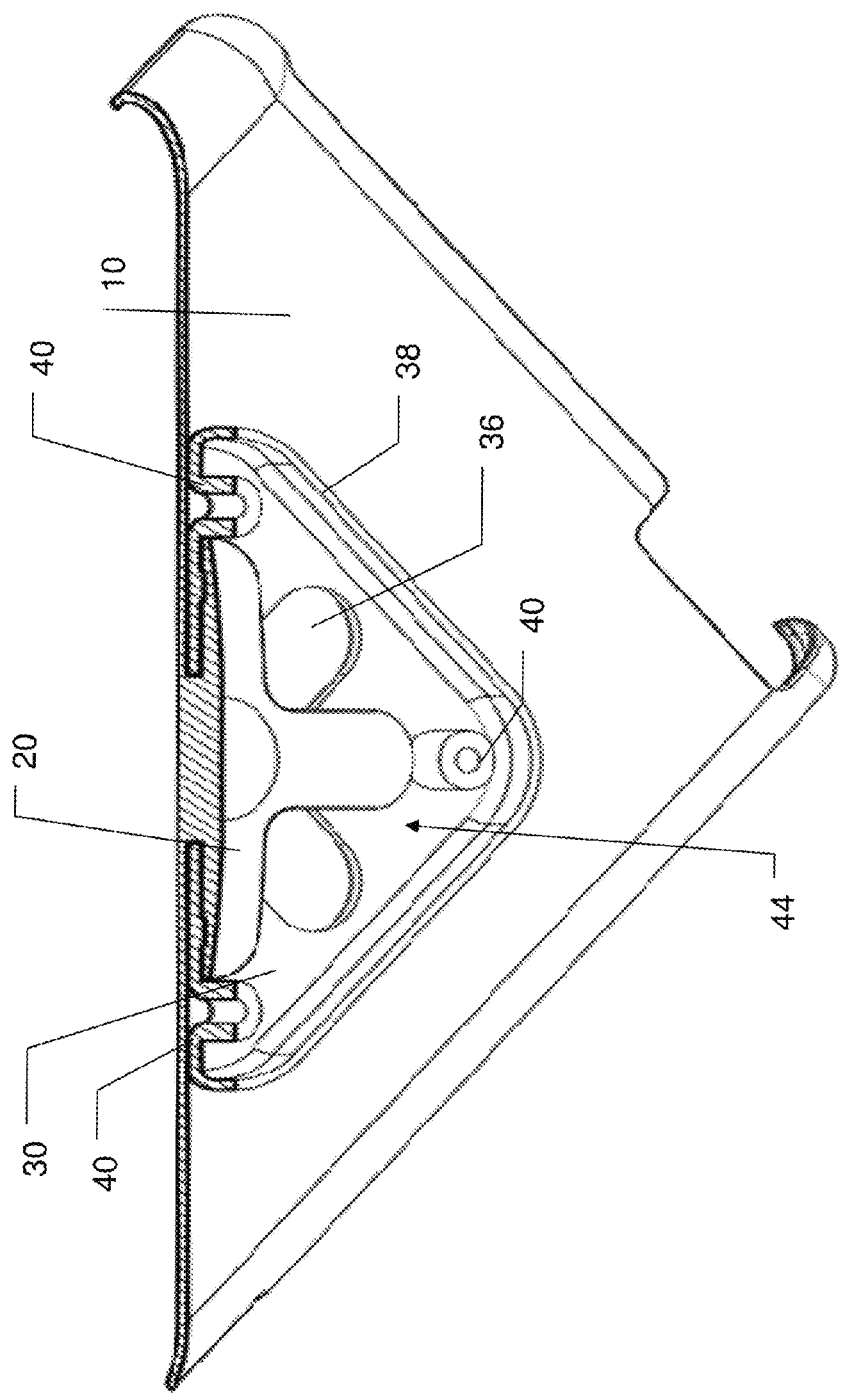

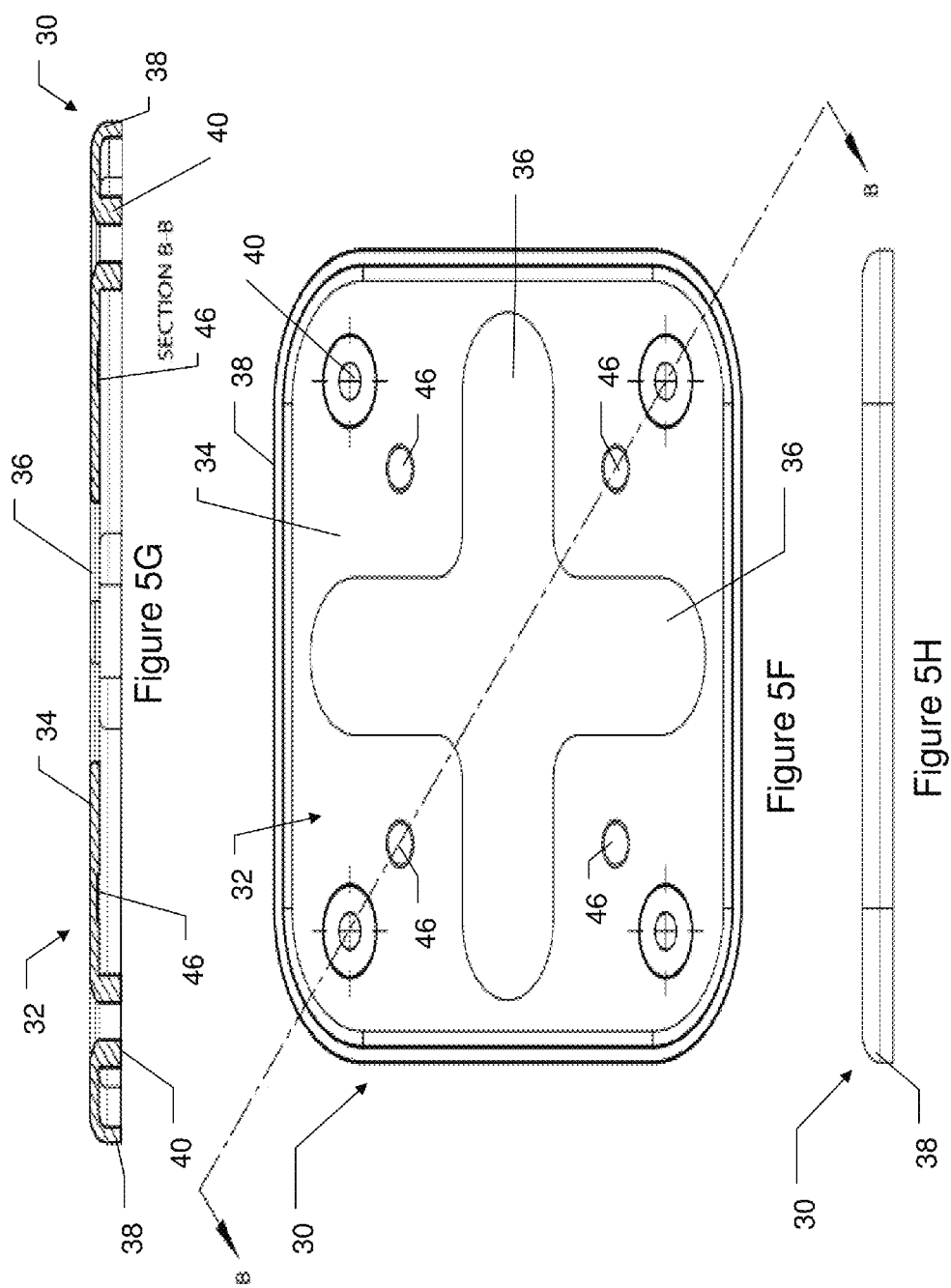

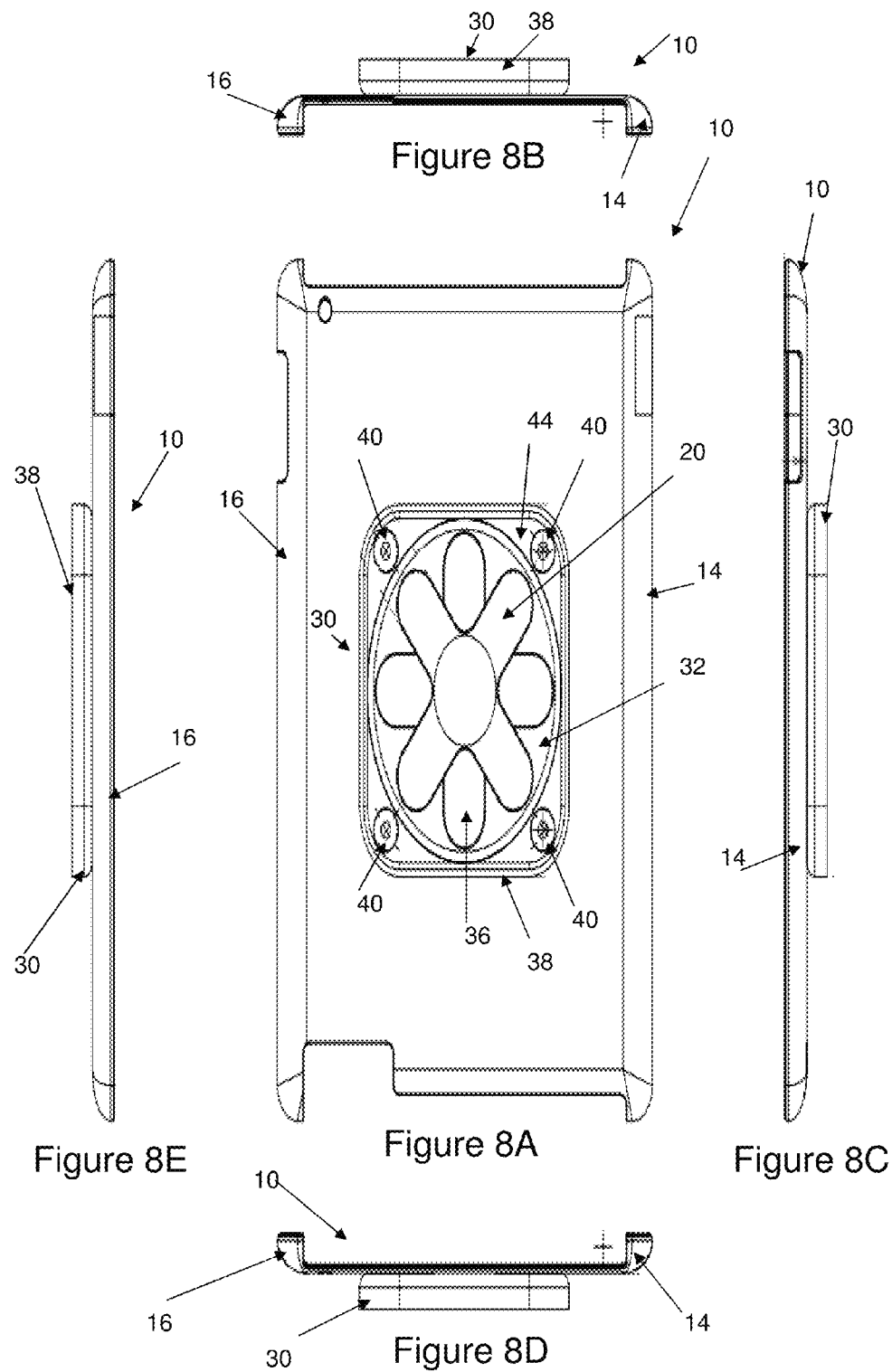

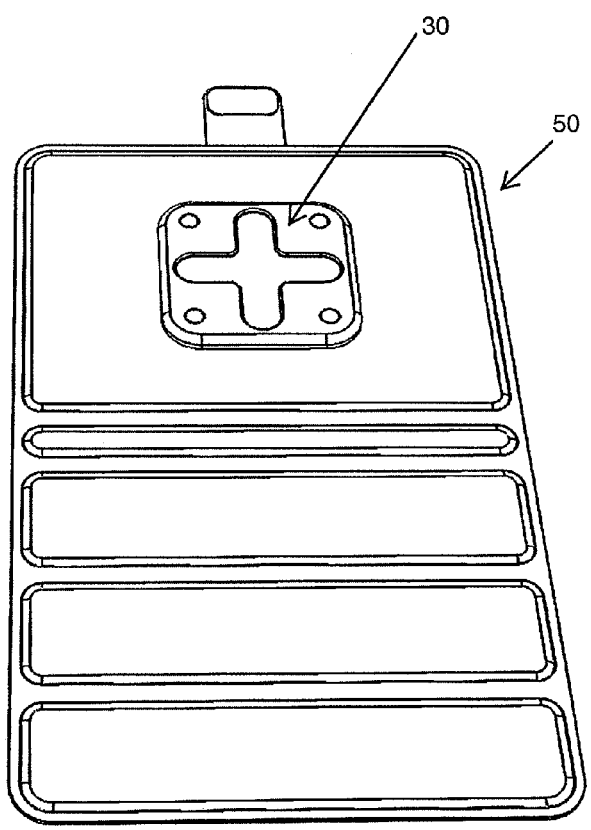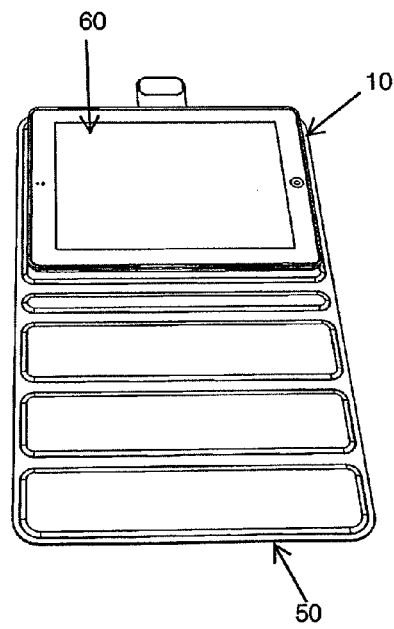
Figure 12A
Figure 12B

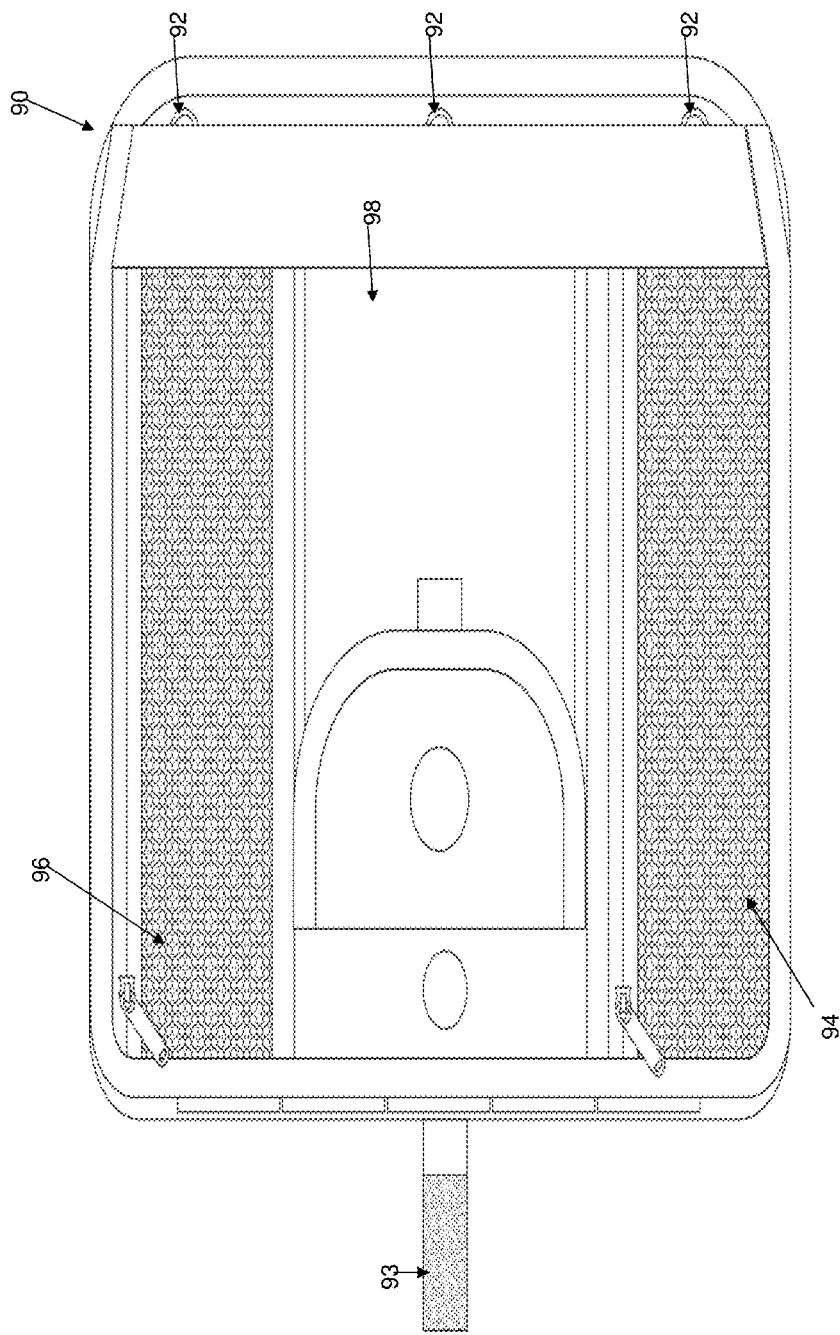

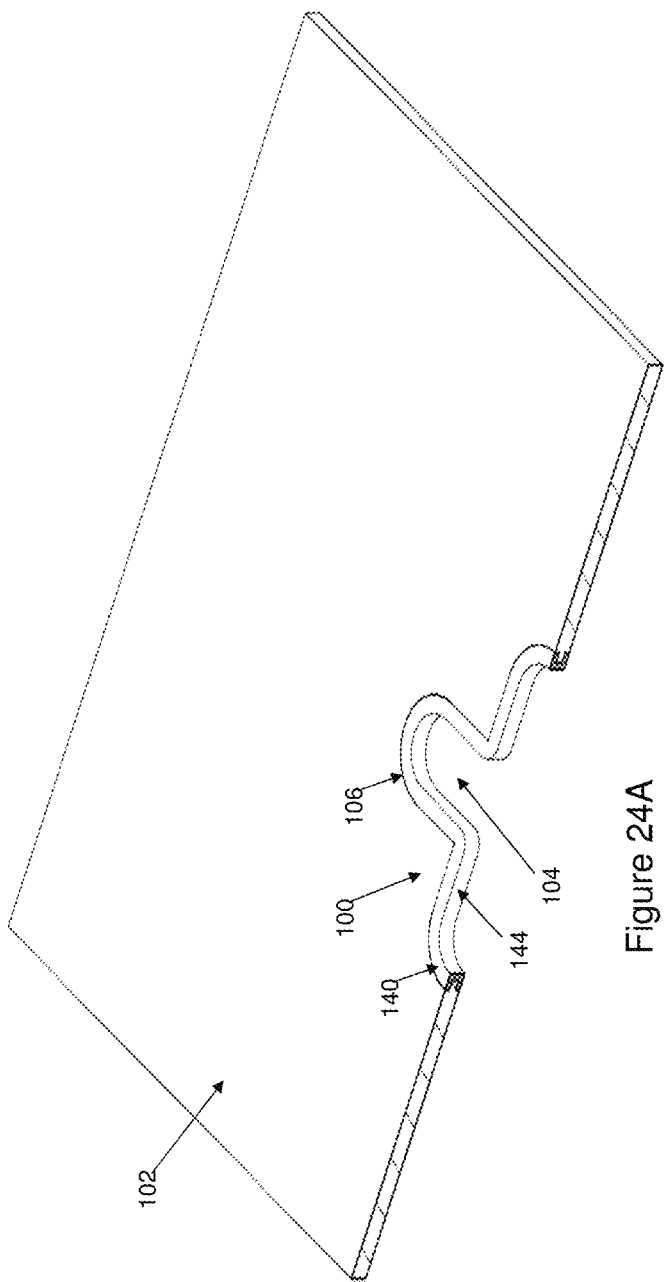
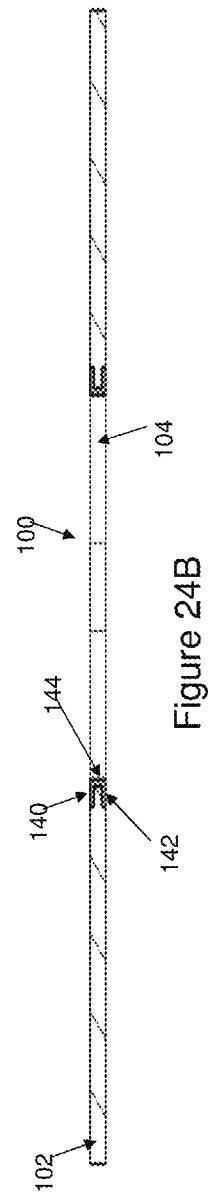

SYSTEM AND APPARATUS FOR MOUNTING A HANDHELD ELECTRONIC DEVICE

CROSS REFERENCE TO RELATED APPLICATIONS

This application claims priority from U.S. Provisional Patent Application Ser. No. 61/822,045 filed on May 10, 2013 which is incorporated herein in its entirety.

BACKGROUND OF THE INVENTION

1. Field of the Invention

The present invention relates to a system and apparatus for mounting a handheld electronic device and, more specifically, to a system and apparatus able to selectively and releasably mount a handheld electronic device to a flat surface.

2. Description of the Prior Art

With the advent and development of personal computers has come the design of smaller handheld electronic devices such as tablet computers, smart phones, handheld video game consoles, etc. As these handheld electronic devices have evolved, devices for protecting and securing the devices as well as to facilitate use of the handheld device during activities such as reading have been developed. However, most of these devices are cumbersome and it is difficult and inconvenient to remove the handheld device from a protecting cover and/or secure the handheld device within or to another surface, device or cover.

SUMMARY OF THE PRESENT INVENTION

An apparatus is provided for selectively and releasably mounting a handheld electronic device within or to any flat surface.

The apparatus includes a mounting plate to be secured to a flat surface. The mounting plate may have a female connector or recess extending therethrough. The female connector or recess may be of any desired shape. When the mounting plate is secured to the flat surface, the female connector will be spaced from the surface to which the mounting plate is secured. The apparatus also includes a back plate within which or to which the handheld electronic device may be releasably secured. On a side of the back plate opposite the handheld electronic device may be a male connector having a similar size and shape to that of the female connector on the mounting plate. The male connector is spaced from the base plate by a distance at least equal to the thickness of the female connector. When the male and female connectors are aligned, the male connector is able to be inserted into and thereby engaged with the female connector. Alternatively, the mounting plate may include a male connector extending from a top side thereof and the base plate may include a female connector for receiving the male connector extending from the mounting plate.

When engaged with the female connector, the male connector will be received within the space between the female connector and the flat surface to which the mounting plate is secured. When the base plate is rotated causing the male and female connectors to be misaligned, the base plate will be releasably secured or locked to the mounting plate.

The male connector may have protrusions or nubs extending from points thereon for mating with corresponding divots on an underside of the mounting plate. Alternatively, the side of the back plate opposite the handheld device may have protrusions or nubs extending from points thereon for mating with corresponding divots on a top side of the mounting plate. When the protrusions or nubs are caused to engage with the corresponding divots, the mounting plate and base plate will be releasably locked together in position. Alternatively, the male connector may include divots therein for engaging with corresponding nubs or protrusions extending from the mounting device for releasably securing or locking the base plate to the mounting plate and in position preventing rotation thereof. In a further alternative embodiment, the side of the back plate opposite the handheld device may include divots therein for engaging with corresponding nubs or protrusions extending from the mounting device for releasably securing or locking the base plate to the mounting plate and in position preventing rotation thereof.

Any number of aligned protrusions and divots may be positioned around the mounting plate and base plate. Based on the spacing of the protrusions and divots, the base plate may be selectively rotated and releasably secured in any orientation with respect to the mounting plate. This allows a user to view and use the electronic computing device at any desired position with respect to the item to which it is secured.

Additional features of the device include the use of the male connector on the base plate as a handle for holding the electronic computing device when not secured to the mounting plate. An embodiment of the present arrangement exists for connecting the base plate to a flat cover. The flat cover may be flexible. In this embodiment, the female connector includes a recess extending through one side of the flat cover, the recess being of size and shape similar to the male connector. For flexible covers, a rigid member may extend around a periphery of the recess extending through the one side of the flat cover. The rigid member will provide additional support for maintaining a connection with a male connector when engaged therewith. The rigid member may be of shape having a top and bottom side spaced from one another and able to receive the edges of the cover defining the recess between the top and bottom sides. The sides of the cover may fit snugly between the top and bottom sides or the rigid member may be retained in position by crimping the top and bottom sides to the cover or alternatively securing the rigid member to the cover. Alternatively or in addition, the flat cover may have a rigid section through which the recess of the female connector extends. In an alternate embodiment the mounting plate may be secured on an outer side of the cover in alignment with the recess thereby providing rigidity to the cover at the recess for selectively engaging with the base member.

The mounting plate or female connector may be connected to any of, but not limited to, an inside or outside cover of a binder, a flexible protective cover, a clipboard, an upright stand, a wall surface, a rigid page divider, a file folder, etc.

BRIEF DESCRIPTION OF THE DRAWING FIGURES

In order that the invention may be more fully understood, it will now be described, by way of example, with reference to the accompanying drawings in which:

FIGS. 1A-1F are illustrative views of a base plate according to invention principles;

FIGS. 2A-2E are illustrative views of a base plate according to invention principles;

FIGS. 4A-4F are illustrative views of a mounting plate according to invention principles;

FIGS. 5A-5J are illustrative views of a mounting plate according to invention principles;

FIGS. 8A-8E are views of the base plate and mounting plate engaged with one another according to invention principles;

FIG. 12A is a view of an inside of a cover including a mounting plate secured therein according to invention principles;

FIG. 12B is a view of an inside of a cover including a mounting plate secured thereto with a base plate and electronic computing device engaged therewith according to invention principles;

FIGS. 17A-17B are views of a divider board/pocket to which a mounting plate according to invention principles is connected;

FIGS. 24A and 24B show cross sectional view of the alternate embodiment for the mounting plate according to invention principles.

DETAILED DESCRIPTION OF THE PREFERRED EMBODIMENT

Figure 2E:
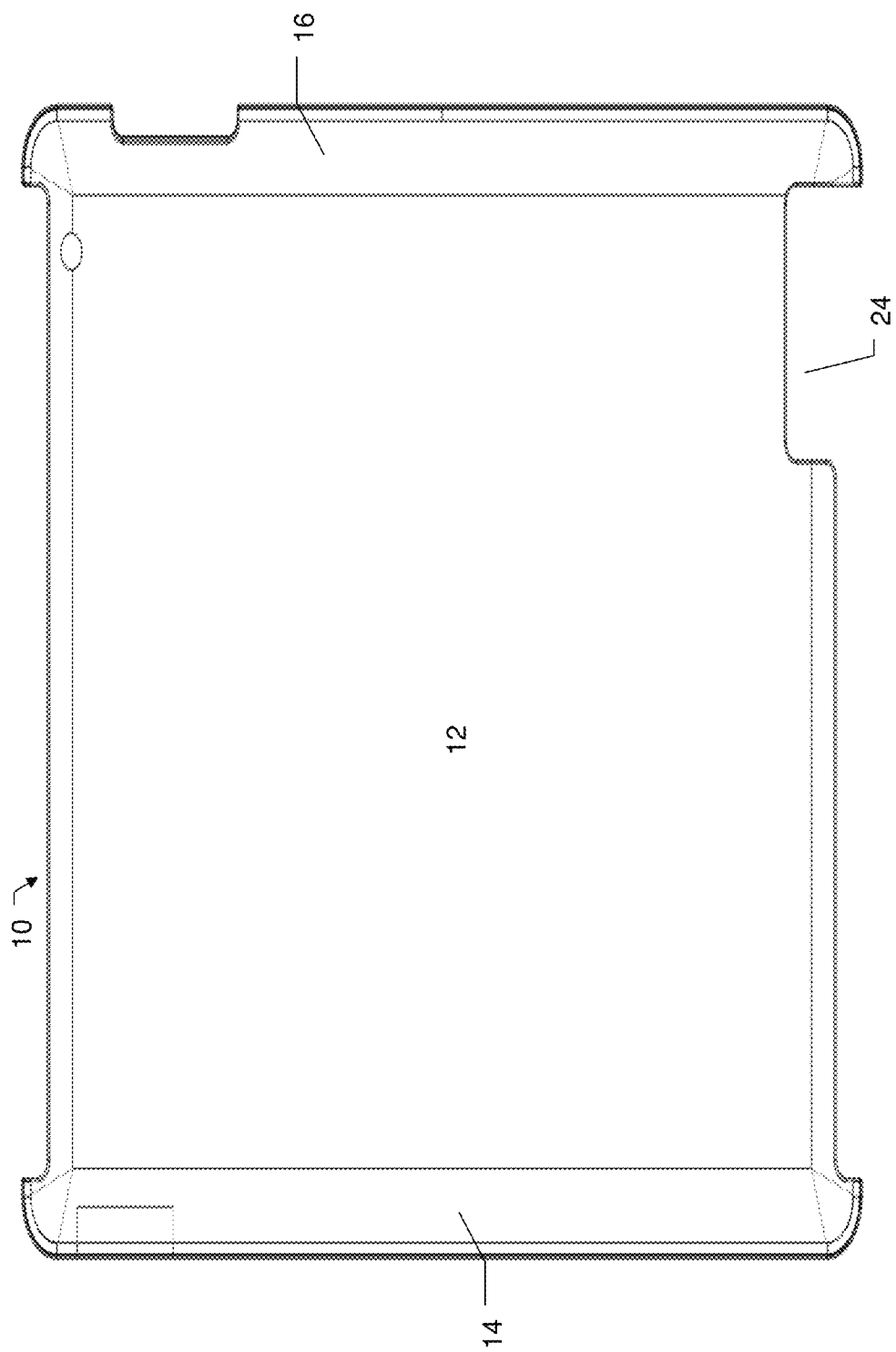

The following discussion describes this device and system. This discussion should not be construed, however, as limiting to any particular embodiment. Practitioners skilled in the art will recognize numerous other embodiments as well.

Turning now to the drawings, FIGS. 1A-1F and 2A-2E illustrate a base plate 10 of the system and apparatus for mounting a handheld electronic device. FIGS. 1A-1F and 2A-2E show similar views of the base plate 10 including a male connector extending therefrom, the male connector having a different orientation in FIGS. 1A-1F from the orientation of FIGS. 2A-2F. The base plate 10 includes a main section 12, a left side wall 14 and a right side wall 16. The left side wall 14 and right side wall 16 each extend along a periphery of and substantially perpendicular to a front side of the main section 12 to form a pool for receiving a handheld device therein. The pool formed by the main section 12, left side wall 14 and right side wall 16 can be seen in FIG. 1B. The pool has a shape and size substantially similar to the shape and size of the respective handheld device it is designed to receive. The base plate 10 shown in the drawings is for purposes of example. The base plate 10 may have dimensions sufficient to receive any size or type of handheld device. The left side wall 14 and right side wall 16 may extend around each respective corner of the main section 12 for engaging corners of a handheld device positioned within the pool and thereby create a more secure fit for selectively retaining the handheld device therein. The main section 12, left side wall 14 and right side wall 16 may include recesses 24 aligned with corresponding buttons and/or ports on a handheld device which it is designed to retain allowing access to and activation of the buttons and ports of the handheld device received thereby. A recess 28 may also be provided for aligning with a camera lens on the handheld device. Recesses 24 within the main section 12 also aid a user in removing a handheld device from the base plate 10. The recesses 24 shown are for purposes of example only and recesses 24 may be positioned at any point on the base plate 10 corresponding to respective buttons and ports on the handheld device for which it is designed to receive.

Extending from a back side 18 of the main section 12 is a male connector 20 as shown in FIG. 1A. FIGS. 1C-1F show top, right side, bottom and left side views of the base plate 10, respectively. Each of these views shows the male connector 20 extending from the back side 18 of the main section 12. The male connector 20 is oriented in a first position in FIGS. 1A and 1C-1F and FIGS. 2A-2D show the base plate 10 including the male connector 20 oriented in a second position offset 45° from the connector in FIGS. 1A and 1C-1F. The male connector 20 in FIG. 1A is shown in the shape of a plus sign, or alternatively in the shape of an "X" in FIG. 2A depending on its orientation. Depiction of the male connector 20 in this shape is for purposes of example only. In practice, any shape may be used for the male connector 20. As such, a female connector of a similar size and shape is necessary on the mounting plate for engaging with the male connector 20. A separator 22 is positioned between the male connector 20 and the back side of the main section 12, securing the male connector 20 to the main section 12 in a spaced relationship therefrom. The separator 22 creates a space between the male connector 20 and the main section 12 of the base plate 10. The male connector 20 is for use with mounting plates having a female connector as shown in FIGS. 4-8 (described hereinbelow). The separator 22 has a thickness substantially equal to a thickness of the mounting plate with which the base plate 10 will be engaged. The separator 22 enables the male connector 20 to be inserted into and engage with the female connector on the mounting plate.

Figure 3:
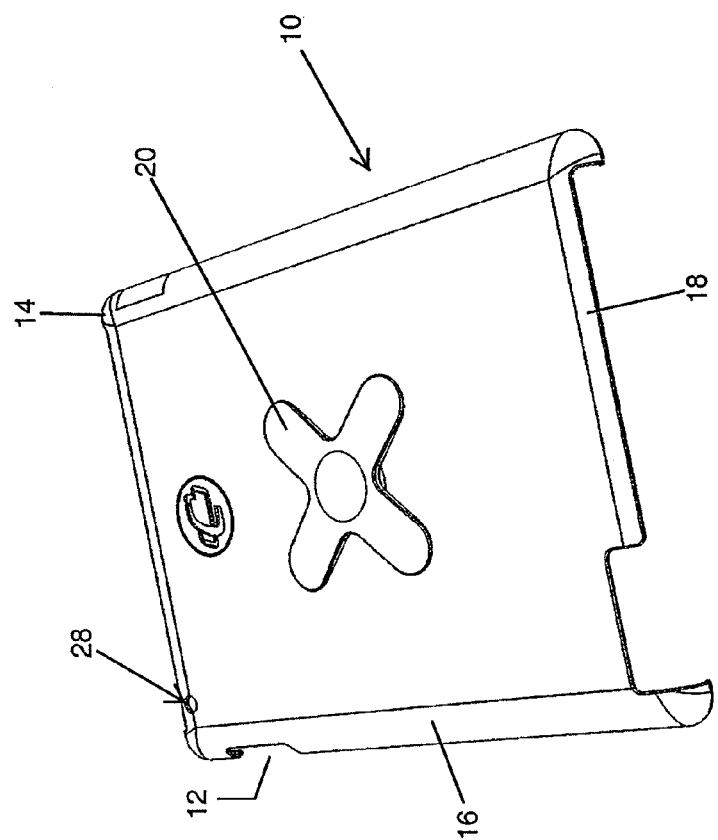
FIG. 3 is a perspective view of a base plate according to invention principles.

Positioned on the male connector 20 are either dimples/divots or protrusions 26. The dimples or protrusions are shown in dashed lines to indicate they are on the side of the male connector facing the main section. The dimples or protrusions 26 will engage corresponding protrusions or dimples, respectively, on an underside of the female connector when the male connector 20 is positioned within the female connector and the base plate 10 is rotated. In the example shown and described, the dimples or protrusions on the male connector 20 are positioned on each leg of the "+" (FIGS. 1A and 1C-1F) or "X" (FIGS. 2A-2F) spaced apart by approximately 90°. Similarly spaced protrusions or dimples are positioned on an underside of the corresponding female connector as will be discussed with respect to FIGS. 4-8. This allows for rotation of the base plate 45° from a position aligned with the female connector and then in 90° increments at which the base plate 10 can be secured in position. The spacing of the dimples and protrusions 26 is described and shown for purposes of example. The spacing and number of dimples and protrusions 26 may be positioned at any point around the male and female connectors as long as the dimples/protrusions on the male connector 20 are in alignment with corresponding protrusions/dimples on the female connector. The spacing of the dimples and protrusions 26 will also depend on the shape of the male and female connectors. Any combination of dimples and protrusions may be positioned around the male connector 20 for mating with corresponding dimples and/or protrusions positioned around the female connector. FIG. 3 shows a perspective back side view of the base plate 10.

A mounting plate 30 for engaging with the base plate 10 is shown in FIGS. 4-8. FIG. 4A shows an underside of the mounting plate 30. The mounting plate 30 includes a female connector 32. The female connector 32 is formed by a main section 34 including a recess 36 extending therethrough. The recess 36 is of a shape substantially similar to the corresponding male connector 20 of the base plate 10. Also positioned on the main section 34 are connectors 40 for securing the mounting plate 30 to a surface. The connectors 40 are shown as including a recess for receiving a securing device for securing the mounting plate 30 to a surface, e.g. by a screw or rivet. The connector 40 is shown as an exemplary device for securing the mounting plate 30 to a surface. However, any means able to secure the mounting plate 30 to a surface may be used. Extending around a periphery of the main section 34 is a skirt 38. The skirt 38 provides a space between the main section 34 and the surface to which the mounting plate 30 is secured. A male connector 20 is received within the space between the underside of the mounting plate 30 and the surface to which it is secured when the male connector 20 is inserted through the recess 36 and engaged with the female connector 32. Positioned on an underside of the main section 34 are either dimples/divots or protrusions 42. The dimples or protrusions 42 may engage corresponding protrusions or dimples, respectively, on the male connector 20 when the male connector 20 is engaged with the female connector 32 and the base plate 10 is rotated. Alternatively, positioned on a top side of the main section 34 are either dimples/divots or protrusions 42. The dimples or protrusions 42 may engage corresponding protrusions or dimples, respectively, on the backside 18 of the base plate 10 when the male connector 20 is engaged with the female connector 32 and the base plate 10 is rotated. In the example shown and described, the protrusions or dimples on the female connector 32 are positioned between each leg of the "X" shaped recess 32 spaced apart by approximately 90°.

FIG. 4B shows a top side of the mounting plate 30. The recess 36 extends through the main section 34 providing access into the space formed between the main section 34 and a surface to which the mounting plate is secured, the space having a depth substantially equal to the thickness of the skirt 38. A connection device 40 is provided on each corner of the main section 34 for securing the mounting plate 30 to a surface. The position and form of the connection device 40 is shown for purposes of example. In practice, any device able to secure the mounting plate 30 to a surface may be used. FIGS. 4C-4F show views of each side of the mounting plate 30. The mounting plate of FIGS. 4A and 4B is shown oriented with the recess forming an "X" when mounted to a surface. In this orientation, the mounting plate is oriented for mating with the base plate of FIGS. 1A-1F where the male connector is oriented as a "+". Thus, when the male connector 20 is aligned with the recess 36, the base plate 10 is turned to a 45° angle from its upright position. Once the male connector 20 is inserted into the recess 36 and the base plate is rotated 45°, the base plate 10 will be engaged with the mounting plate 30 in an upright position.

Figure 5I:
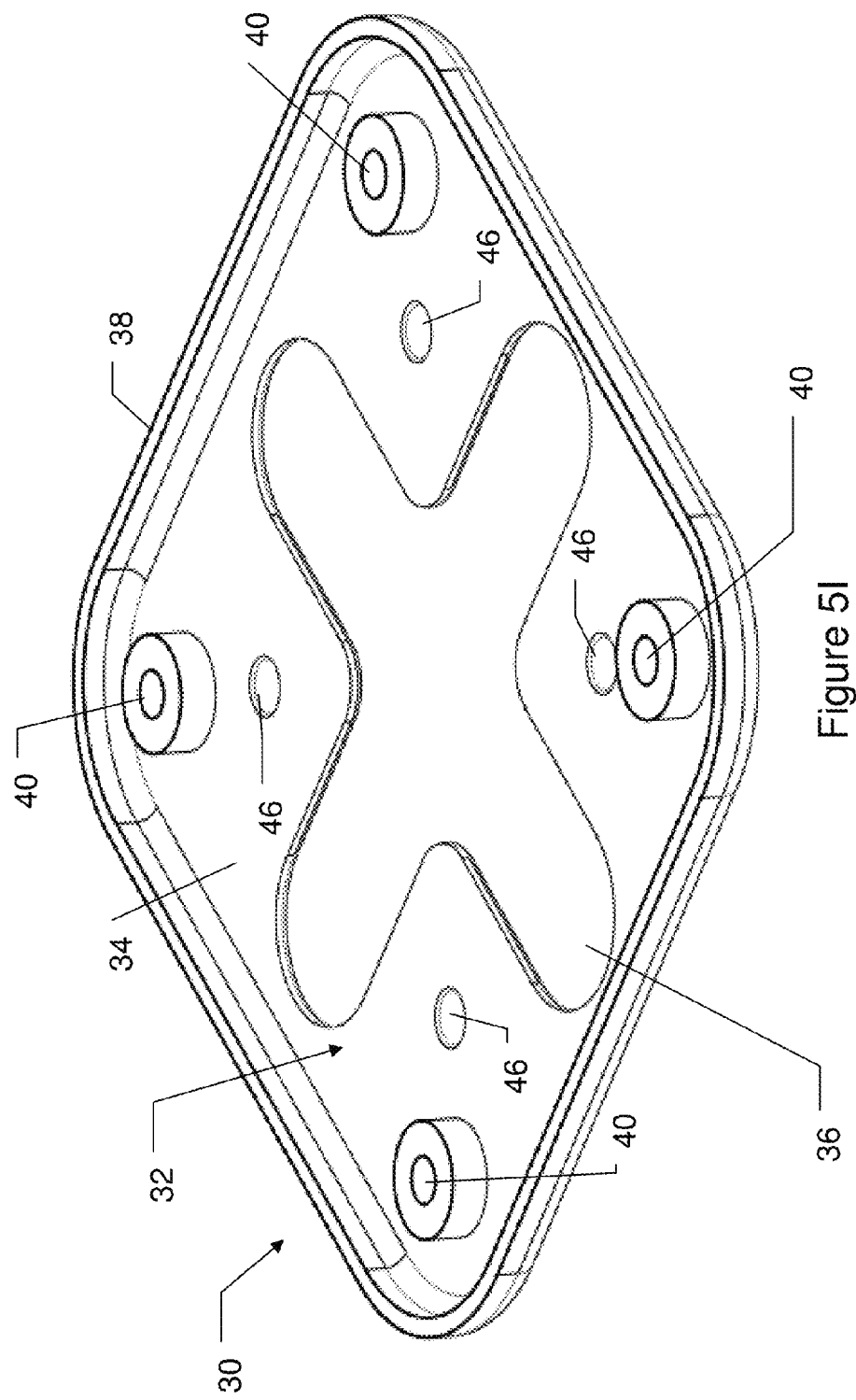

FIGS. 5A-5K show various views including cross sectional views of the mounting plate 30. FIG. 5A shows a similar view to FIG. 4A. FIG. 5B is a cross sectional view of the mounting plate 30 taken along the line A-A in FIG. 5A. From this view the space 44 within which a male connector 20 will be seated when engaged with the mounting plate 30 is seen. Extending into the space 44 on an underside of the main section 34 are the protrusions 42 for engaging with corresponding dimples on a male connector. The connection device 40 is shown as a passage for receiving a fastener. The connection device is shown extending from the main section 34 and through the space 44 for positioning against a surface to which the mounting plate 30 will be secured. The skirt 38 extends a distance from the main section 34 substantially equal to the connection device 40. The recess 36 for receiving the male connector is centrally positioned on the main section 34. FIG. 5C shows a side view of the mounting plate 30.

FIG. 5D shows a perspective view of the underside of the mounting plate 30. From this view the space 44 within which a male connector 20 will be seated when engaged with the mounting plate 30 is seen. The recess 36 for receiving the male connector 20 is centrally positioned on the main section 34. Extending into the space 44 on an underside of the main section 34 and positioned around the recess 36 are the protrusions 42 for engaging with corresponding dimples on a male connector. The bottom side of connection device 40 is shown as a passage for receiving a fastener. The connection device is shown extending through the space 44 with the bottom side of the connection device being positioned against a surface to which the mounting plate 30 will be secured. The skirt 38 extends a distance from the main section 34 substantially equal to the distance the connection device 40 extends and is also positioned against a surface to which the mounting plate 30 is connected.

A cross sectional bottom view of the mounting plate 30 engaged with the base plate 10 is shown in FIG. 5E. The base plate 10 is positioned on top of and engaged with the mounting plate 30. The male connector 20 is shown on an underside of the recess 36 and offset from the recess 36. When the male connector 20 is inserted through the recess and into the space 44 it is aligned with the recess 36. Once inserted, the male connector 20 is rotated to be offset from the recess 36 thereby engaging the dimples on the top side of the male connector 20 with the protrusions extending from the underside of the main section 34 of the mounting plate 30. The back side of the base plate 10 is shown seated against a top side of the mounting plate 30.

FIG. 5F shows a mounting plate 30 similar to the mounting plate in FIG. 5A. However, the mounting plate 30 in FIG. 5F includes dimples 46 (see FIG. 5G) instead of the protrusions 42 shown in FIG. 5A.

The mounting plate 30 of FIGS. 5A and 5F is shown oriented with the recess forming a "+" when mounted to a surface. In this orientation, the mounting plate 30 is oriented for mating with the base plate of FIGS. 2A-2E where the male connector is oriented as an "X". Thus, when the male connector 20 is aligned with the mounting plate 30, the base plate 10 is turned to a 45° angle from its upright position. Once the male connector 20 is inserted into the recess 36, the base plate 10 is rotated 45° to engage with the mounting plate 30 in an upright position. FIG. 5H shows a side view of the mounting plate 30 similar to FIG. 5C. FIG. 5I shows an underside of the mounting plate 30 of FIGS. 5F-5H including dimples 46.

Figure 5J:
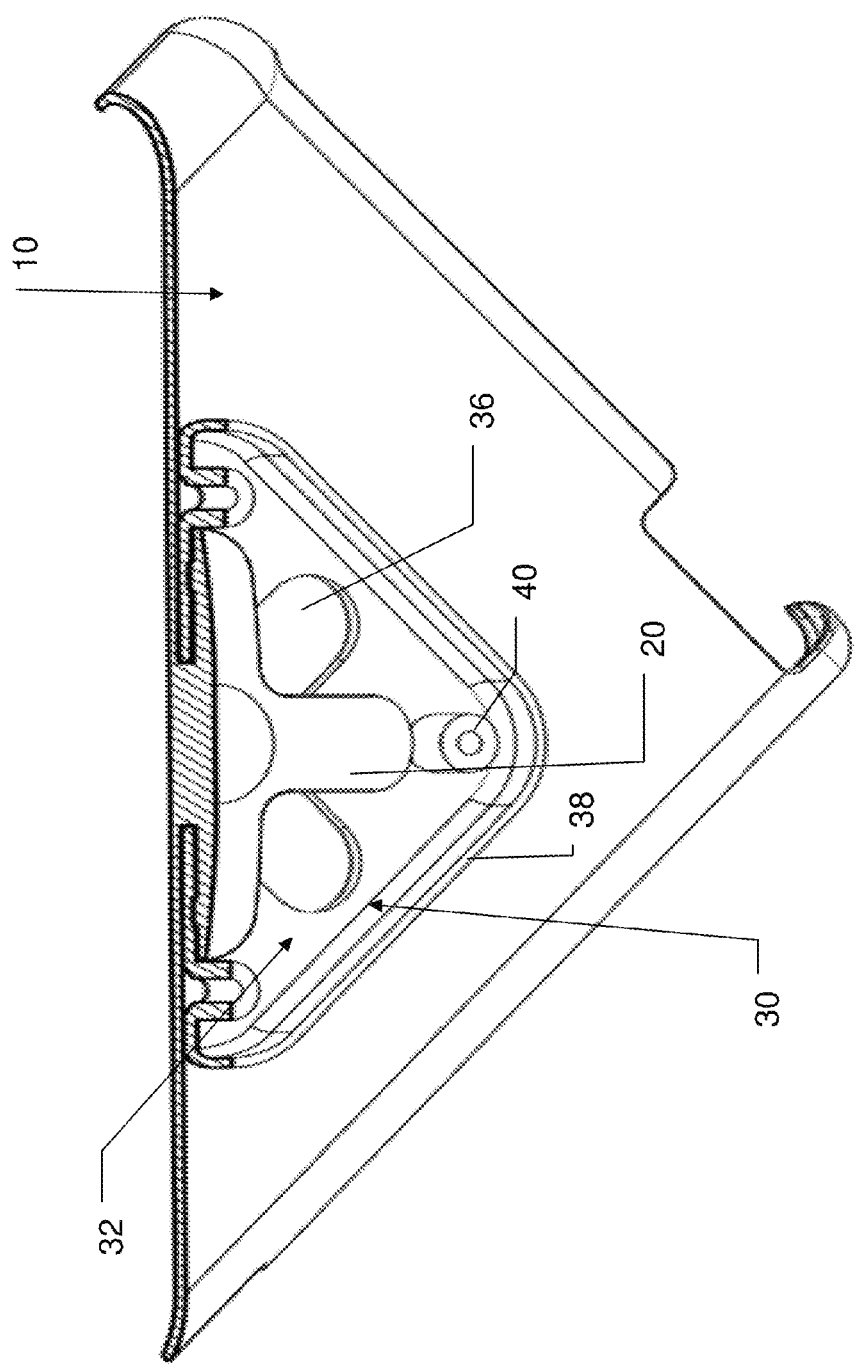

A cross sectional bottom view of the mounting plate 30 shown in FIGS. 5F-5I engaged with the base plate 10 is shown in FIG. 5J. The base plate 10 is positioned on top of and engaged with the mounting plate 30. The male connector 20 is shown on an underside of the recess 36 and offset from the recess 36. When the male connector 20 is inserted through the recess and into the space 44, it is aligned with the recess 36. Once inserted, the male connector 20 is rotated to be offset from the recess 36 to thereby engage the protrusions extending from the top side of the male connector 20 with the dimples on the underside of the main section 34 of the mounting plate 30. The back side of the base plate 10 is shown seated against a top side of the mounting plate 30.

Figure 6A:
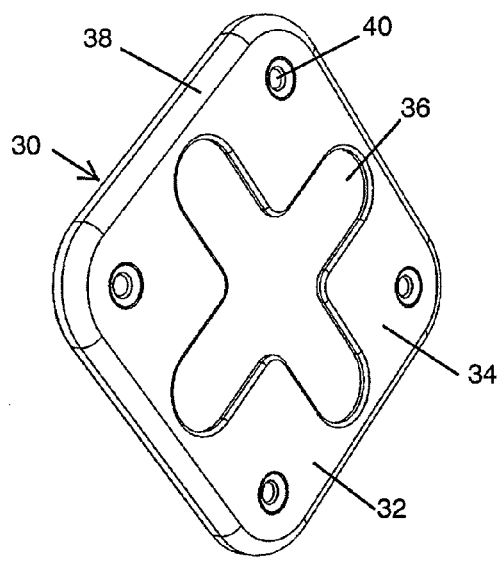
FIGS. 6A and 6B are perspective views of a mounting plate according to invention principles.
Figure 6B:
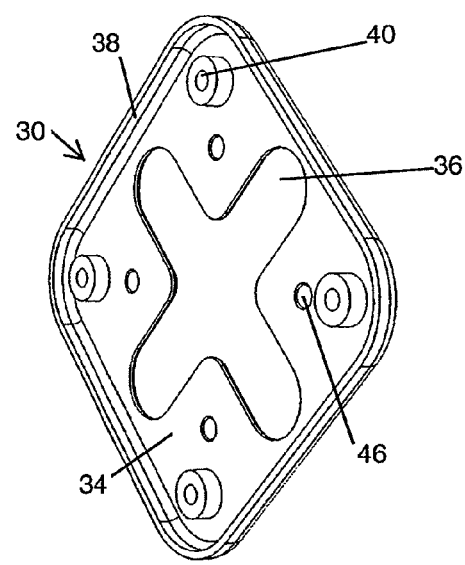
Figure 7:
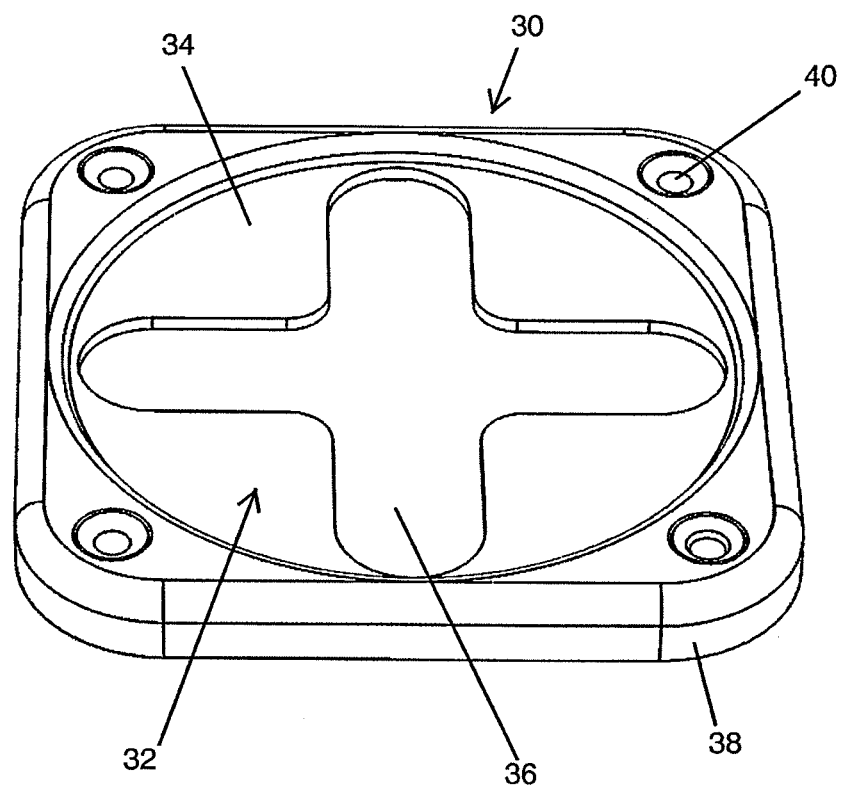
FIG. 7 is a front perspective view of a mounting plate according to invention principles.

FIGS. 6A, 6B and 7 show perspective views of the mounting plate 30 in different orientations. FIG. 6A shows the mounting plate oriented to form an "X" when secured to a surface. FIG. 6B shows a bottom side of the mounting plate shown in FIG. 6A. FIG. 7 shows the mounting plate oriented to form a "+" when secured to a surface. As can be seen from these figures the mounting plate 30 includes a female connector 32 including the main section 34 and the recess 36. The skirt 38 extends around a periphery of the main section 34 to space the main section 34 of the mounting plate 30 from any surface to which it is secured. Positioned around and extending through the top surface are connection devices 40 for insertion of fasteners for securing the mounting plate 30 to a surface. The recesses are shown for example only and in practice any method or device for securing the mounting plate 30 to a surface may be used. The recess 36 of the female connector 32 extends through the main section 34 of the mounting plate 30. The recess 36 receives a male connector of similar size and shape therethrough. As the main section 34 is caused to be spaced from a surface to which it is connected by the skirt 38, the male connector 20 will be received in the space between the main section 34 of the mounting plate 30 and the surface to which the mounting plate 30 is secured when inserted into the female connector. On an underside of the top surface and positioned spaced around the female connector are either dimples or protrusions. FIG. 6B shows dimples 46 positioned around the recess 36. The dimples or protrusions will engage with respective protrusions or dimples on the male connector 20 to selectively lock the male connector 20 in place when inserted in the female connector and rotated.

FIGS. 8A-8E show the apparatus according to invention principles in an engaged mode. As can be seen, FIG. 8A shows a back view of the system including a mounting plate 30 with the base plate 10 releasably secured thereto. As can be seen from this figure, the male connector 20 is positioned within the space 44 on the underside of the top surface of the mounting plate 30. The male connector 20 has been inserted through the recess 36 of the female connector 32 and the base plate 10 has been rotated thereby causing the male connector to be offset from the recess 36, selectively locking the base plate 10 to the mounting plate 30. FIGS. 8B-8E show different side views with the base plate and mounting plate secured together. The connector device 40 is shown for securing the mounting plate 30 to a surface.

When engaged with the female connector, the male connector having the illustrated shape may be offset between 0° and 45° from the orientation of the recess of the female connector. Thus, the base plate and male connector must be rotated between 0° and 45° in order to be offset from and engage with the female connector. As display screens are able to reorient themselves, the base plate and handheld electronic device may be rotated any desired amount while remaining engaged with the mounting plate to view the handheld electronic device in any desired position. The 45° offset of the male and female connectors are described and shown for purposes of example only. In practice, the offset can be at any angle above 0° so that when the male connector is inserted into the recess of the female connector, it can be rotated to selectively lock in place and removal therefrom is prevented by engagement with rigid walls of the female connector. Positioned on the male connector are either dimples/divots or protrusions. The dimples or protrusions will engage corresponding protrusions or dimples, respectively, on an underside of the female connector when the male connector is positioned within the female connector and the base plate is rotated. In the example shown, the protrusions or dimples on the male connector are preferably positioned spaced apart by approximately 90°. Similarly spaced dimples or protrusions are positioned on the underside of the female connector. This allows for rotation of the base plate 45° from a position aligned with the female connector and then in 90° increments at which the base plate can be secured in position. The spacing of the dimples and protrusions are described and shown for purposes of example. The spacing of dimples and protrusions may be positioned at any point around the male and female connectors as long as the dimples/protrusions on the male connector are in alignment with protrusions/dimples on the female connector. The spacing of the dimples and protrusions will also depend on the shape of the male and female connectors.

Figure 9A:
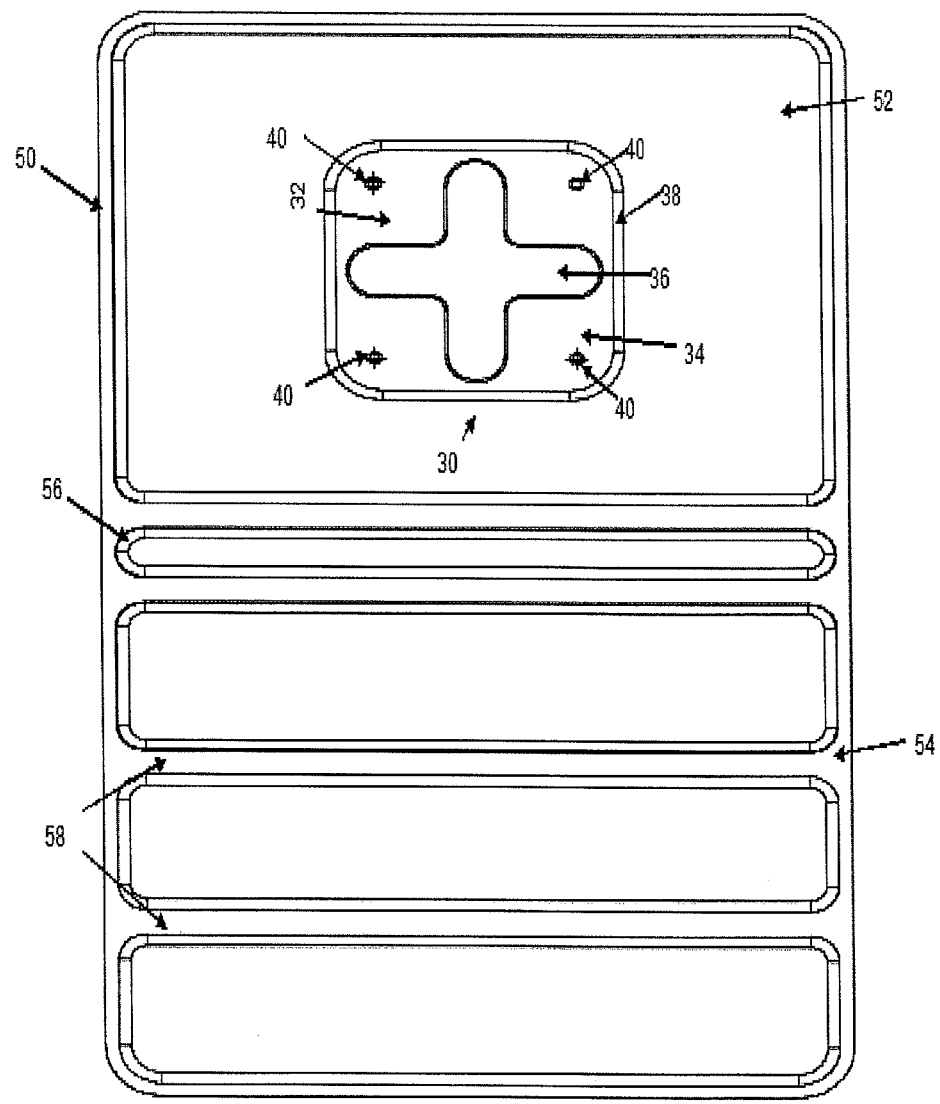
FIGS. 9A-9C are views of a mounting plate secured within a cover according to invention principles.
Figure 9B:
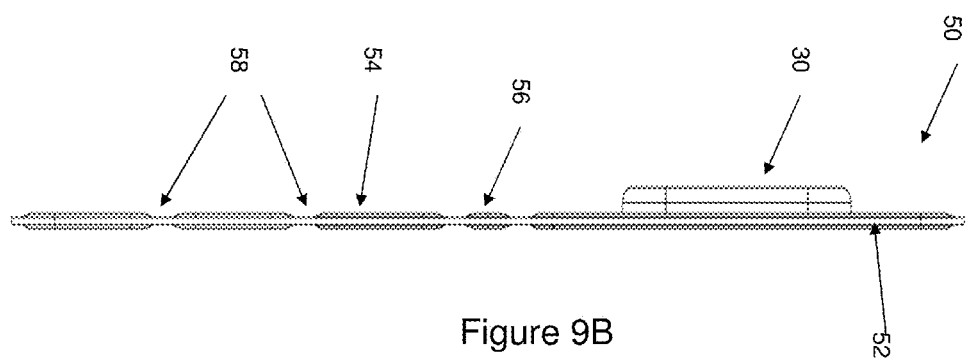
Figure 9C:
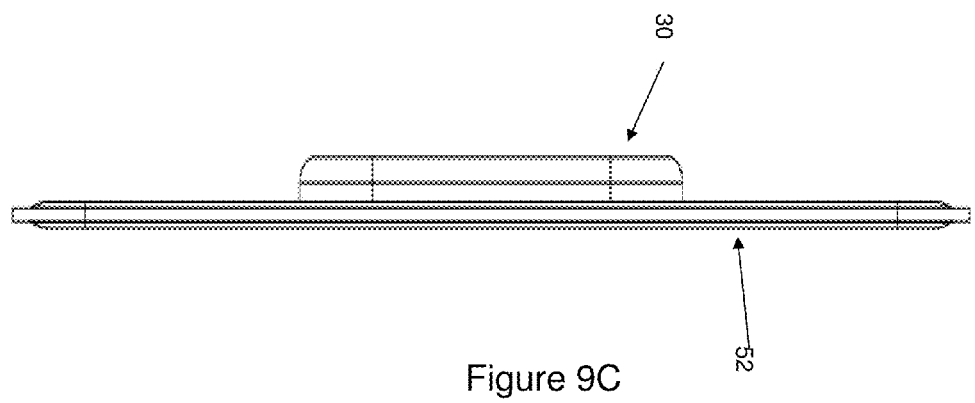

FIGS. 9A-9C show the mounting plate 30 secured to a protective cover 50. The mounting plate 30 may be secured to an inside 52 of the protective cover 50 and when the base plate is positioned to engage with the mounting plate and be secured in place, the handheld electronic device can be protected by a top side 54 of the protective cover 50 folded over the face of the handheld device along a binding 56. In one embodiment, the protective cover in FIGS. 9A-9C may be a protective cover for a handheld computing device such as an iPad, a tablet, a PDA, etc. . . . . The protective cover 50 may include folds 58 therein to allow a computing device being held by a base plate engaged with the mounting plate 30 to be propped up for a user.

Figure 10B:
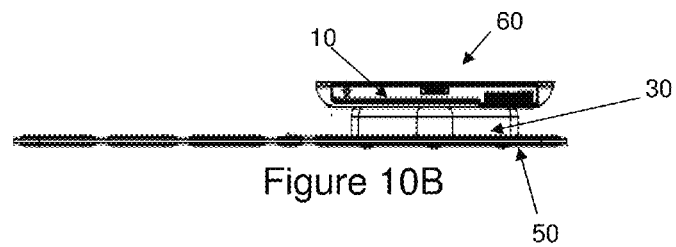
FIGS. 10A-10E are views of a cover including a mounting plate secured thereto with a base plate and electronic computing device engaged therewith according to invention principles.
Figures 10A, 10C, 10E:
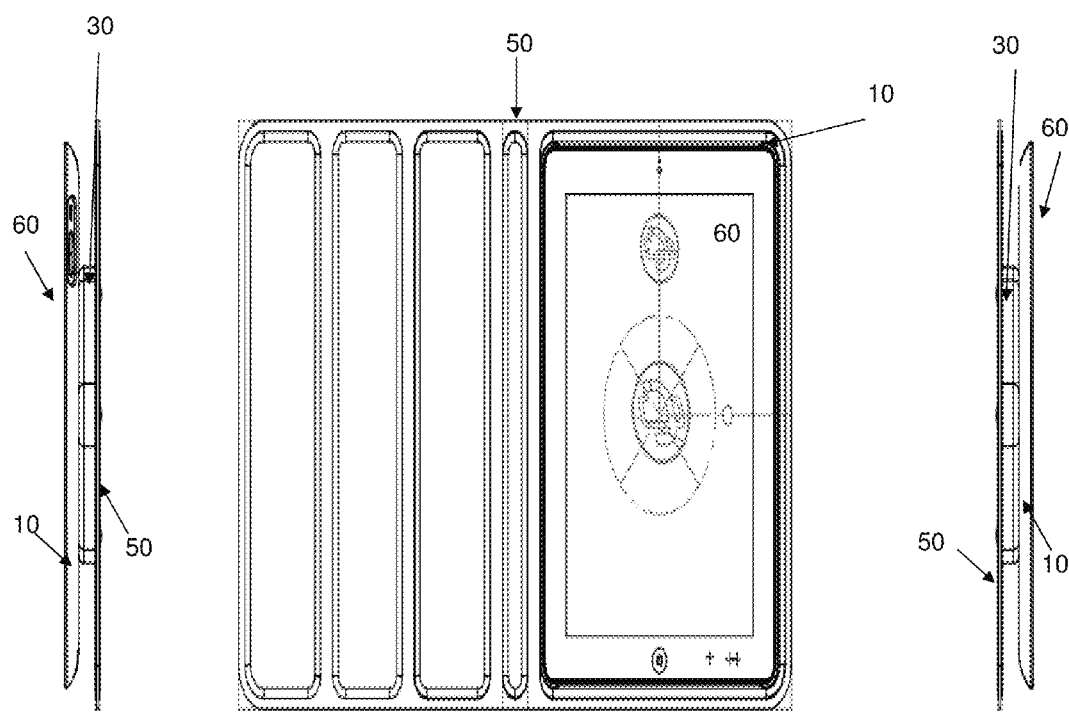
Figure 10D:
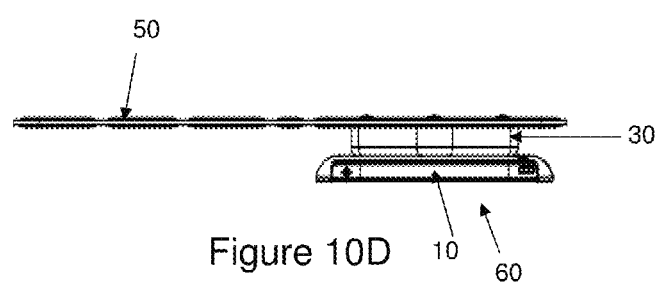

FIGS. 10A-10E show the protective cover 50 with a mounting plate 30 secured therein. A handheld electronic device 60 is releasably secured within a base plate 10. The base plate 10 is engaged with the mounting plate 30 thereby retaining the handheld electronic device 60 within the protective cover 50. FIG. 10A shows a view of the handheld electronic device positioned within the protective cover with the cover in an open position allowing a user to operate the handheld protective device. FIGS. 10B-10E show different side views of the mounting device secured within the protective cover and retaining a handheld electronic device within the protective cover.

Figure 11:
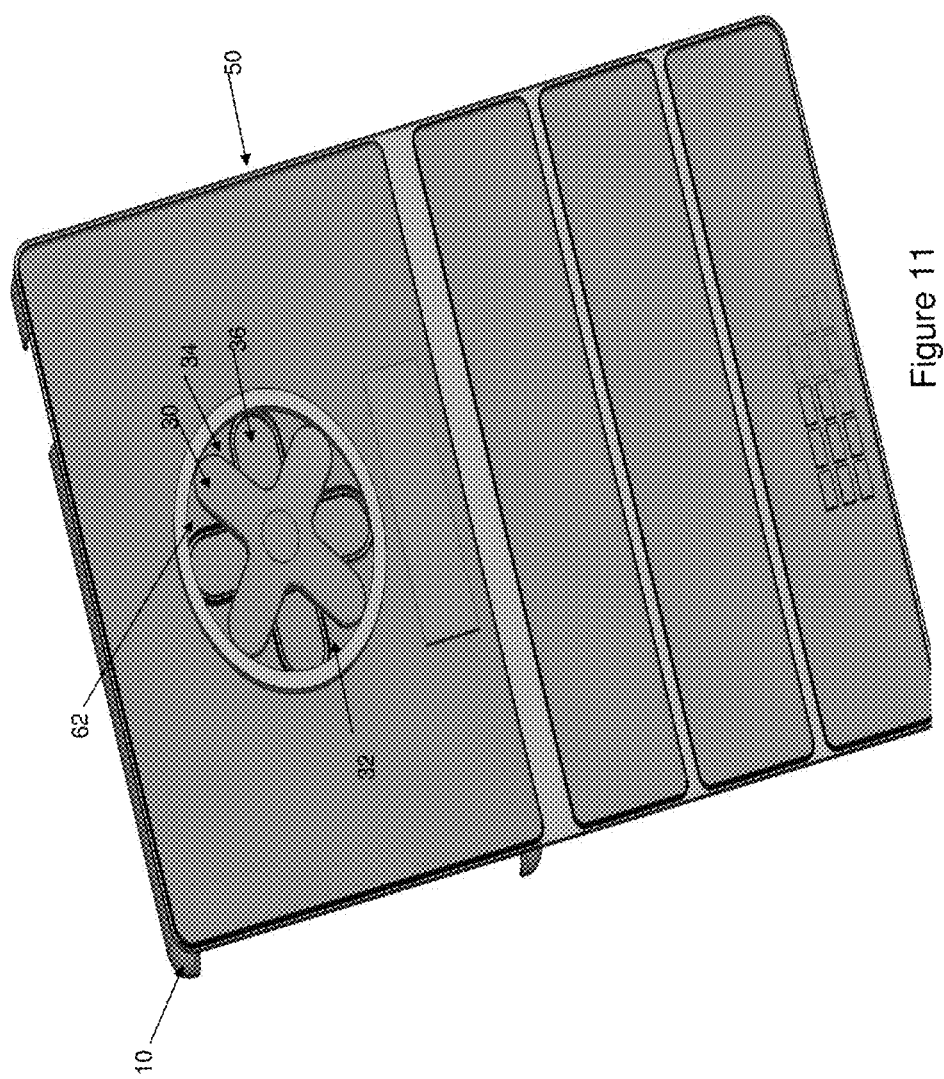
FIG. 11 is a perspective view of an outside of a cover including a recess through which engagement between the male and female connectors is visible.

FIG. 11 shows a perspective view of the outside of the protective cover 50 including a recess 62 therein through which the engagement of the male connector 20 and female connector 32 can be seen. A cover the size and shape of the recess may be provided to hide or cover the recess 62 and block the view of the male and female connectors. The male connector 30 is not aligned with the recess 36 of the female connector 32. In this position, the male connector 20 is engaged with the female connector 32 retaining the handheld electronic device 60 in an upright position within the protective cover 50. The base plate 10 may be rotated with respect to the mounting plate to change the orientation of the handheld electronic device 60 within the protective cover 50. In order to retain the base plate 10 within the mounting plate 30, the male connector 20 must not be aligned with the recess 36 of the female connector 32. When the male connector 20 is aligned with the recess 36, the base plate 10 may be removed from its engagement with the mounting plate 30.

Figures 13A, 13B:
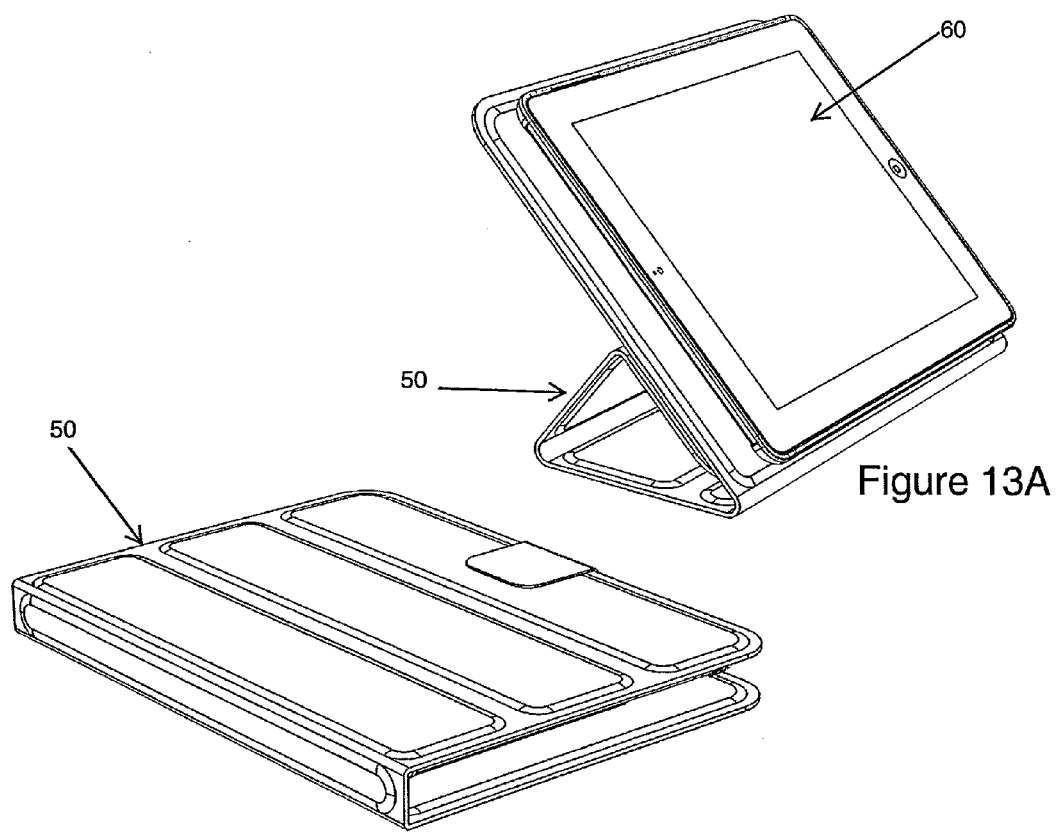
FIG. 13A is a view of a cover including a mounting plate secured thereto with a base plate and electronic computing device engaged therewith according to invention principles, the cover being folded over to create a stand.
FIG. 13B is a view of a cover including a mounting plate secured thereto with a base plate and electronic computing device engaged therewith according to invention principles, the cover being folded over to enclose the electronic computing device therein.

FIGS. 12A and 12B show additional views of a protective cover 50. FIG. 12A shows the protective cover in an open position and the mounting plate 30 secured to an inside face of the protective cover 50. FIG. 12B shows a handheld electronic device 60 secured within the base plate 10. The base plate 10 and handheld electronic device 60 are secured to the mounting plate 30 within the protective cover 50. FIGS. 13A and 13B show the protective cover 50 in different positions. FIG. 13A shows the protective cover 50 folded to create a stand for the handheld electronic device 60. FIG. 13B shows the protective cover 50 in a closed position protecting the handheld electronic device.

Figure 14:
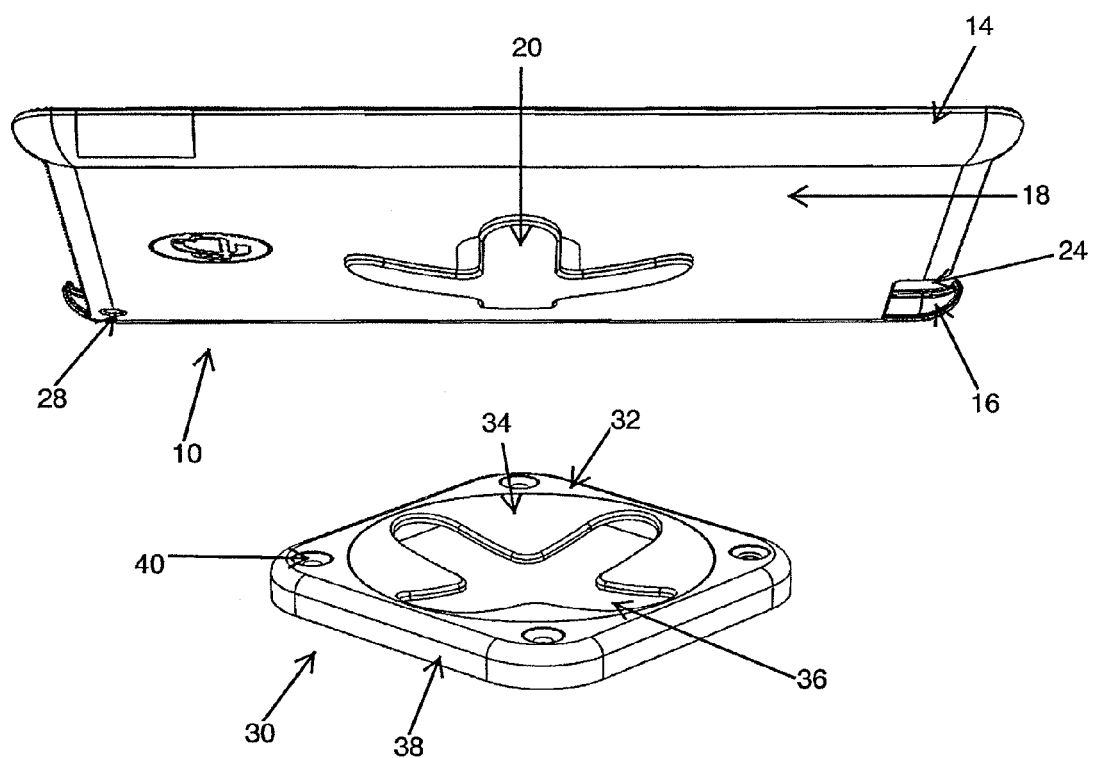
FIG. 14 is a perspective view of a mounting plate and a base plate according to invention principles.

FIG. 14 shows a perspective view of a mounting plate 30 and a base plate 10. In this figure the female connector 32 is shown having an arced surface and recess and the male connector 20 is formed with a similar arc. When the male connector 20 is inserted into the recess 36 of the female connector 32 and rotated, the arced surface of the male connector 20 will match or slide along an underside of the arced surface of the female connector 32 and the dimples or protrusions on a side of the male connector facing the backside 18 of the main section 12 are able to engage the protrusions or dimples on the underside of the female connector 32 thus releasably locking the mounting plate 30 and base plate 10 together. When the female connector 32 and male connector 20 have arced surfaces as shown in FIG. 14, the separator 22 must be of a length long enough to cause the male connector 20 to extend through the recess 36 and be rotated along an underside of the female connector 32 when the base plate 10 is positioned against the mounting plate 30. Additionally, the skirt 38 surrounding the mounting plate 30 must be thick enough to provide enough space between the underside of the female connector 32 and the surface to which the mounting plate 30 is secured to accommodate the male connector 20.

Figure 15A:
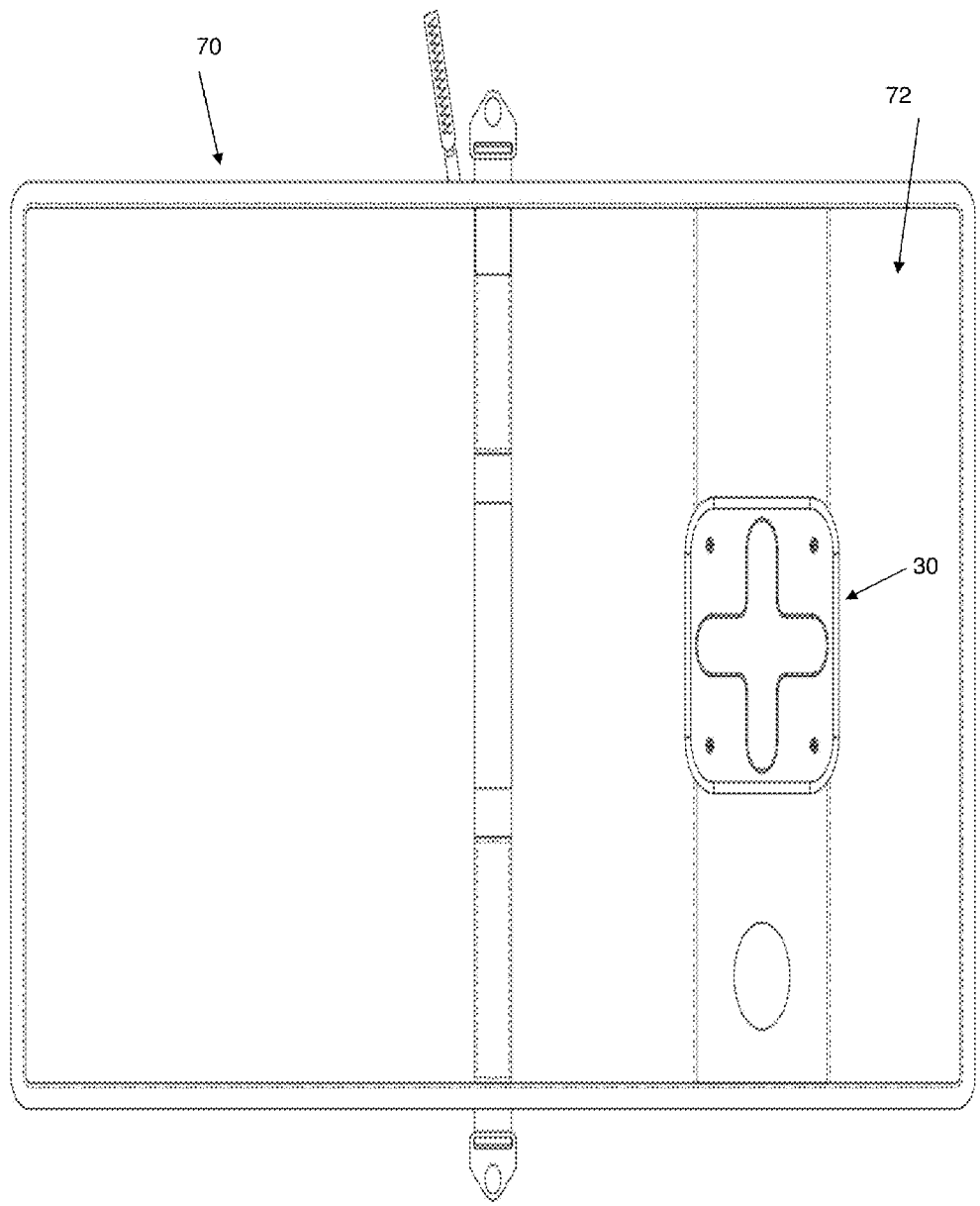
FIGS. 15A-15E are views of a gusseted binder to which a mounting plate according to invention principles is connected.
Figure 15B:
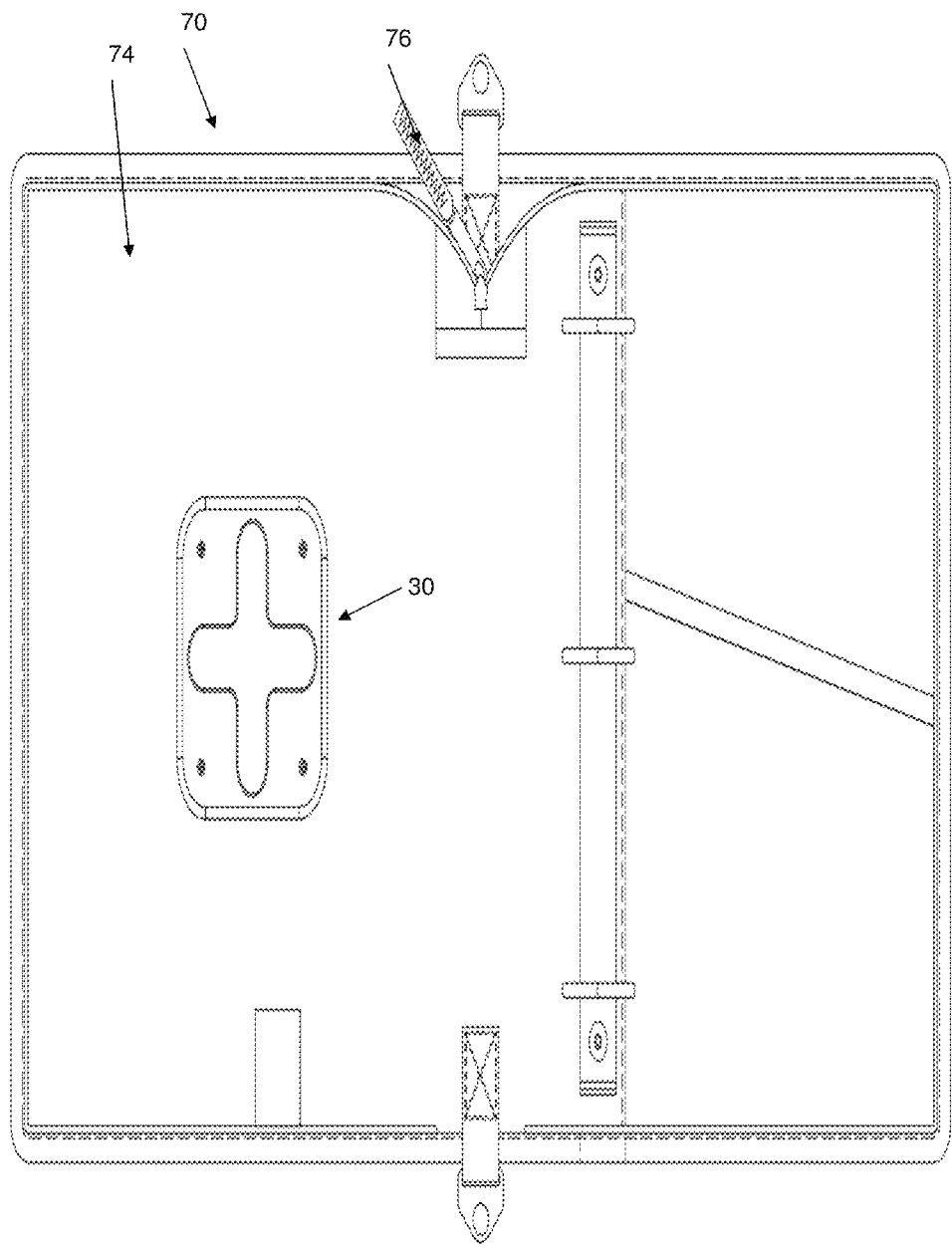
Figure 15D:
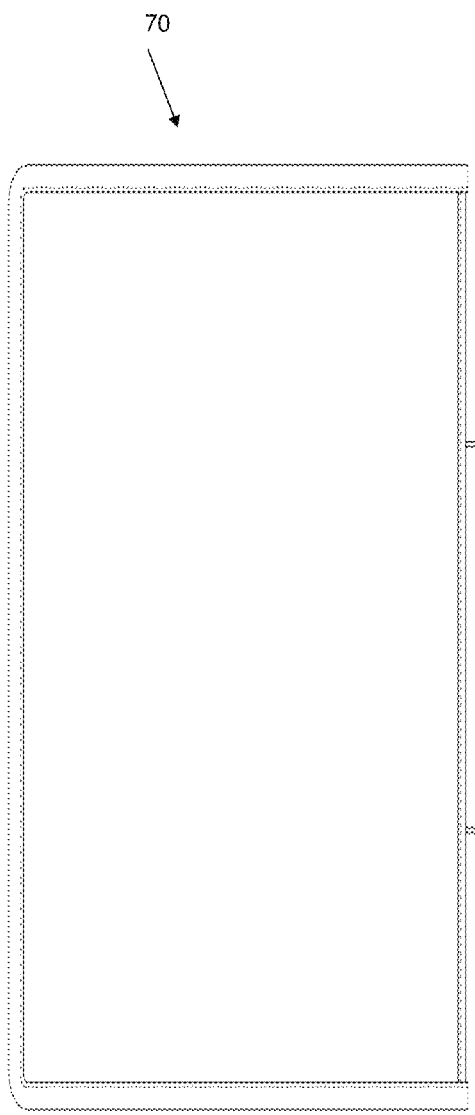
Figure 15C:
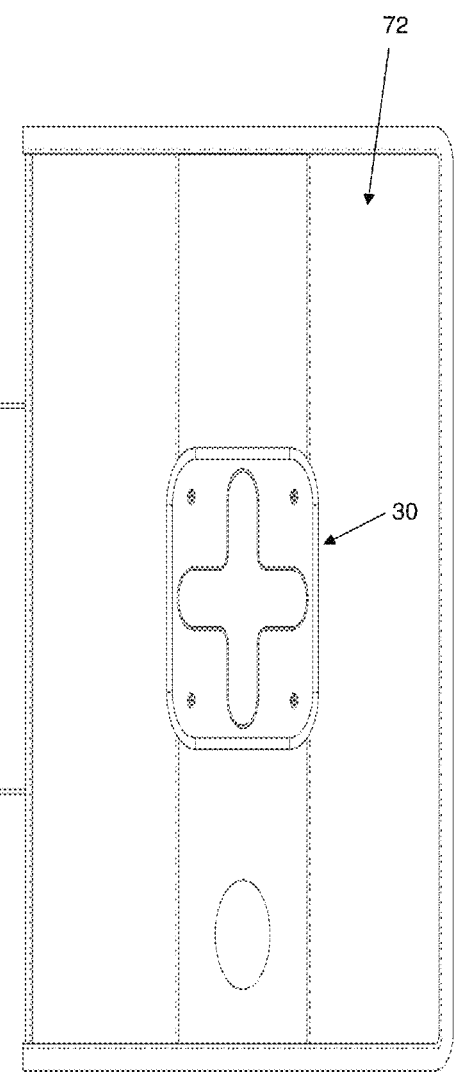
Figure 15E:
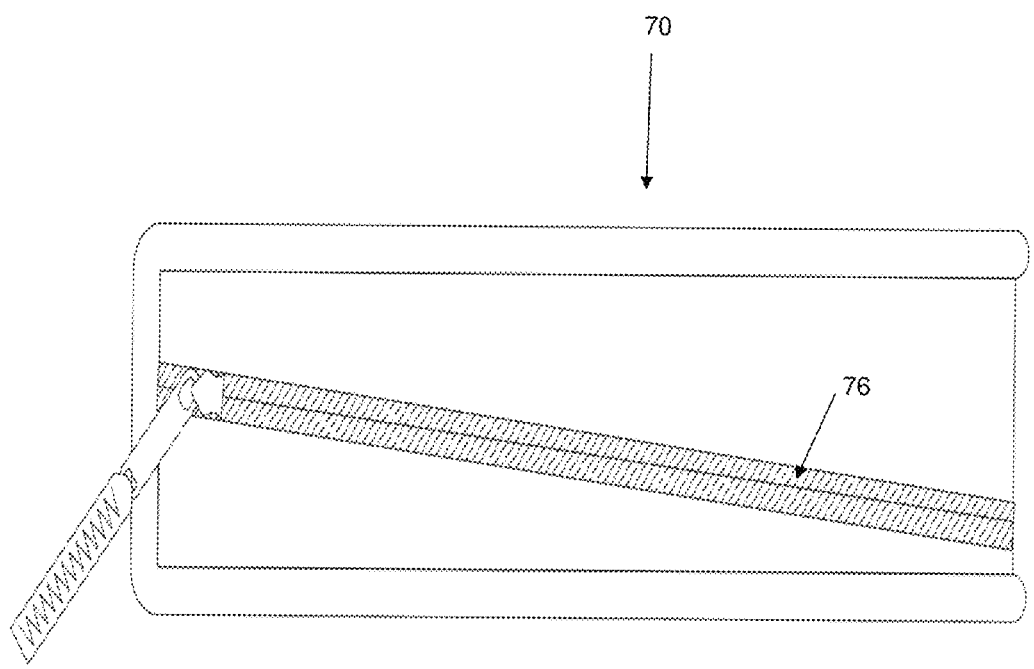

FIGS. 15A-15E show a binder 70 including the mounting plate 30 secured to either an inside or outside surface thereof. FIGS. 15A and 15C show the mounting plate 30 secured to an outside surface 72 and FIG. 15B shows the mounting plate 30 secured to an inside surface 74 of the binder 70. When secured to an outside surface 72, a handheld electronic device connected to a base plate 10 engaged with the mounting plate 30 can be used with the binder 70 acting similar to a clipboard. In this manner, the handheld electronic device is accessible at all times as it forms an outside surface of the binder 70. When secured to an inside surface 74 of the binder 70, the handheld electronic device connected to a base plate 10 and engaged with the mounting plate 30 can be used when the binder 70 is open. The binder 70, when closed, acts as a protective cover for the handheld electronic device. The binder 70 shown in FIG. 15B includes a zipper 76 for closing the binder 70 and securing it shut thereby further protecting a handheld electronic device secured therein. The inside or outside surface 74 or 72, respectively, to which the mounting plate 30 is secured must have either a rigid section to which the mounting plate 30 is secured or be rigid throughout. This provides a secure surface to which the mounting plate 30 may be connected. The binder shown in FIGS. 15A-15E is a three ring binder. The depiction of a three ring binder is for purposes of example only and any binder or folder to which the mounting plate 30 may be secured may be used. FIG. 15D shows another surface of the binder 70 and FIG. 15E shows the binder 70 in a closed position acting to protect a handheld electronic device secured to the mounting plate 30 therein.

Figure 16A:
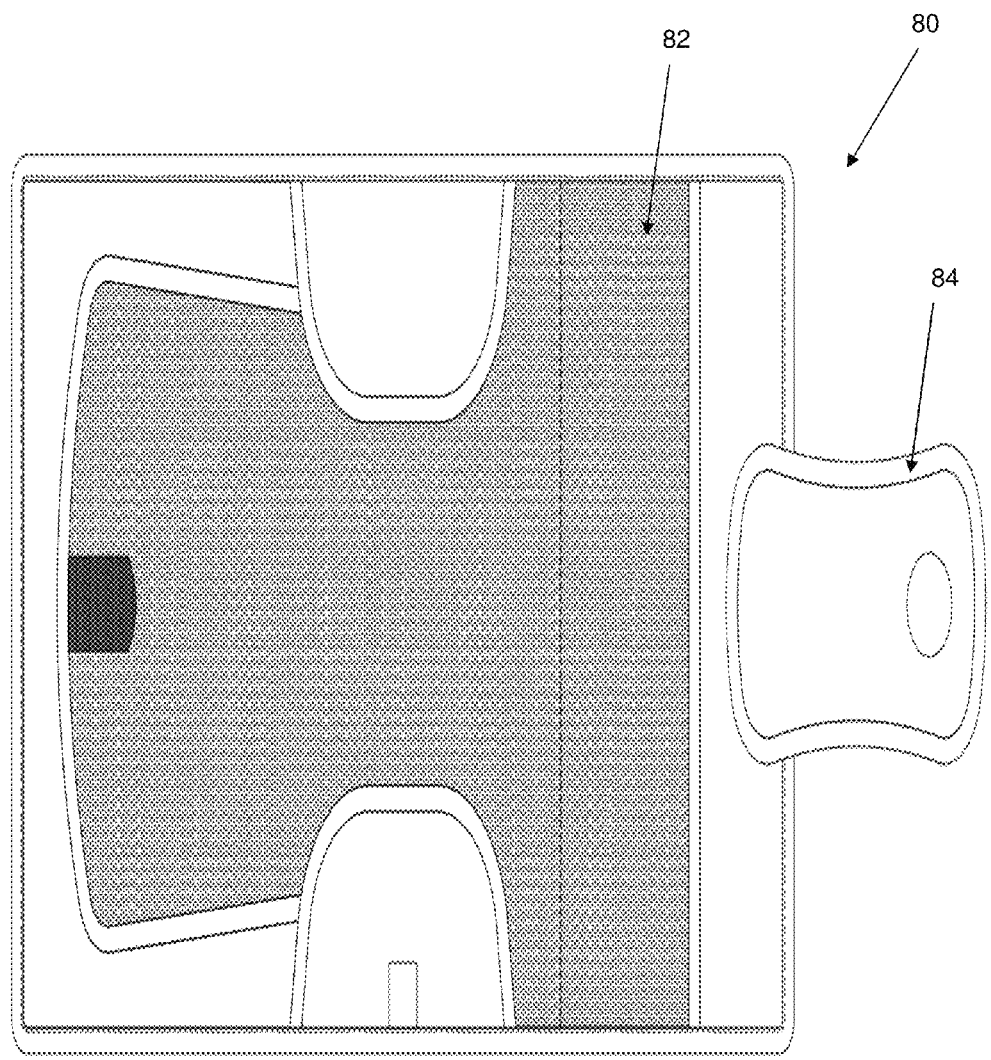
FIGS. 16A-16E are views of a non-gusseted binder to which a mounting plate according to invention principles is connected.
Figure 16B:
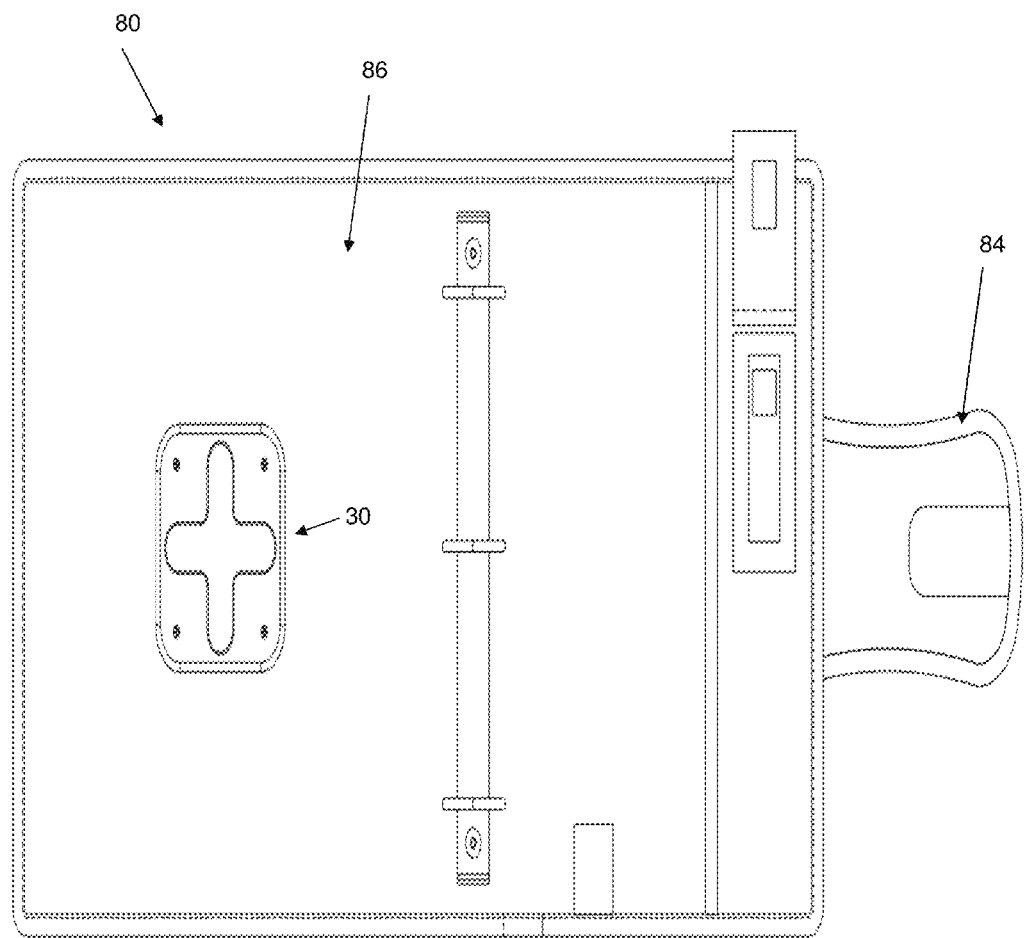
Figure 16C:
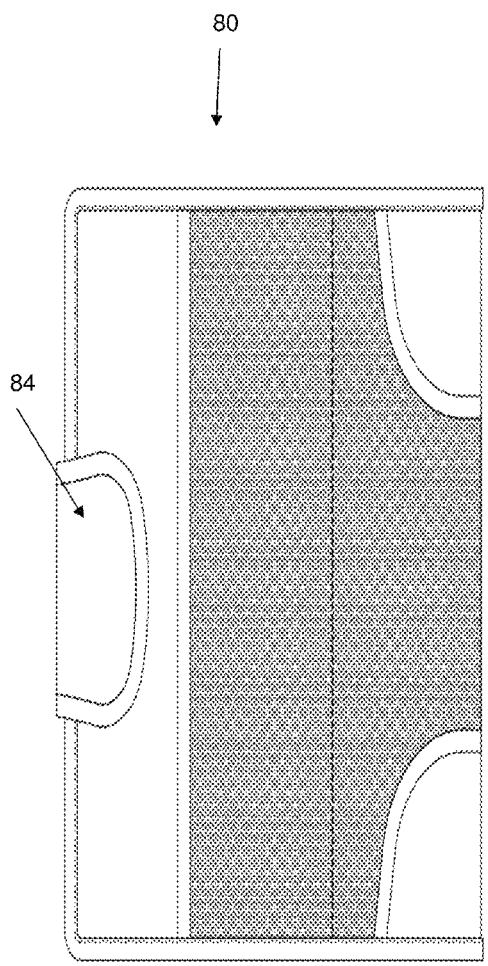
Figure 16D:
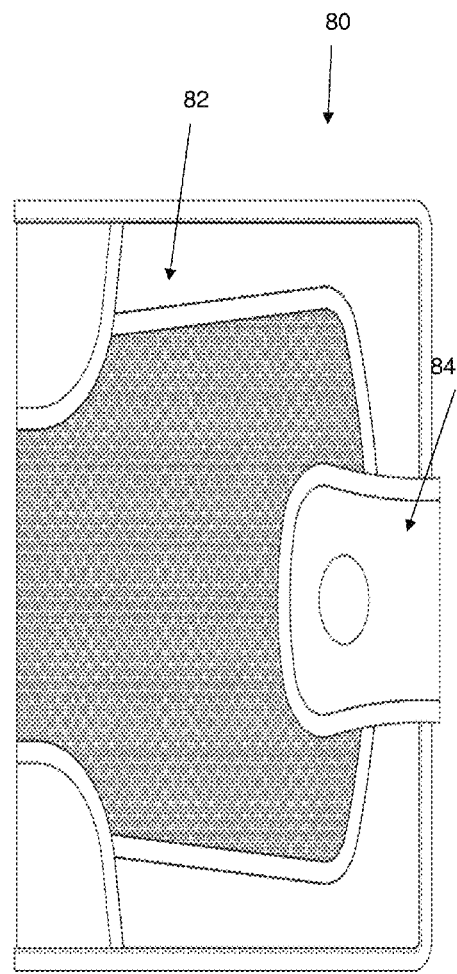
Figure 16E:
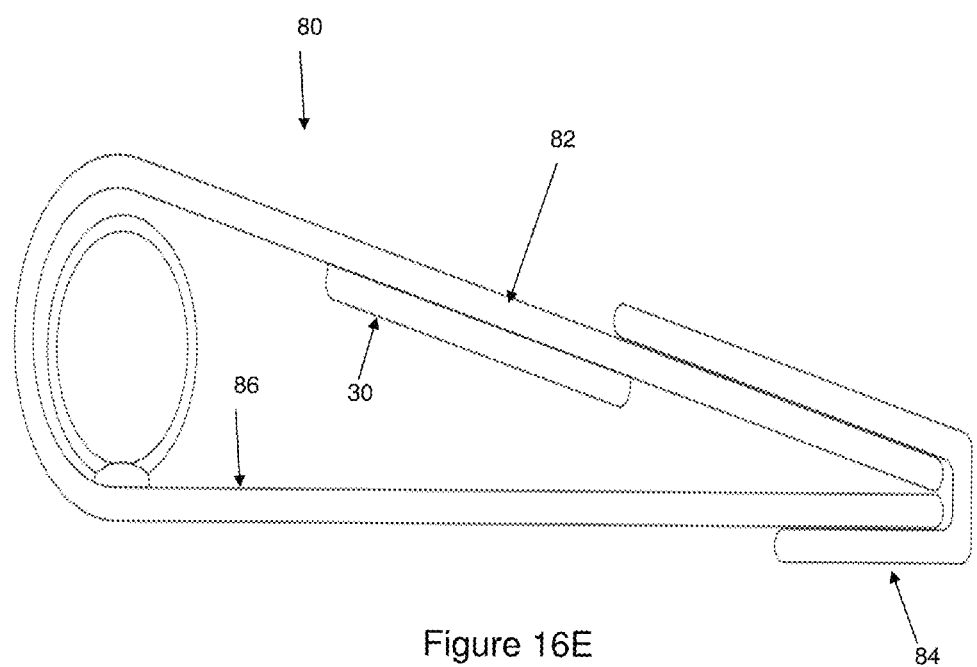

FIGS. 16A-16E show a smaller binder 80 similar to that shown in FIGS. 15A-15E including a mounting plate 30 secured to an inside surface of the binder. FIG. 16A shows an outside cover 82 of the binder spread open to see the front and back covers. The binder 80 may include a fastening device 84 for releasably securing the binder 80 in a closed position. FIG. 16B shows an inside surface 86 of the binder 80 spread open to show the inside front and back covers with a mounting plate 30 secured to the front inside cover. The binder shown in FIGS. 16A-16E is a three ring binder. The depiction of a three ring binder is for purposes of example only and any binder or folder to which the mounting plate may be secured may be used. FIGS. 16C and 16D show the front and back covers, respectively, with the binder 80 in a closed position. FIG. 16E shows a side view of the binder 80 in a closed position. From this view, the mounting plate 30 secured to the inside front cover can be seen.

Figure 17A:
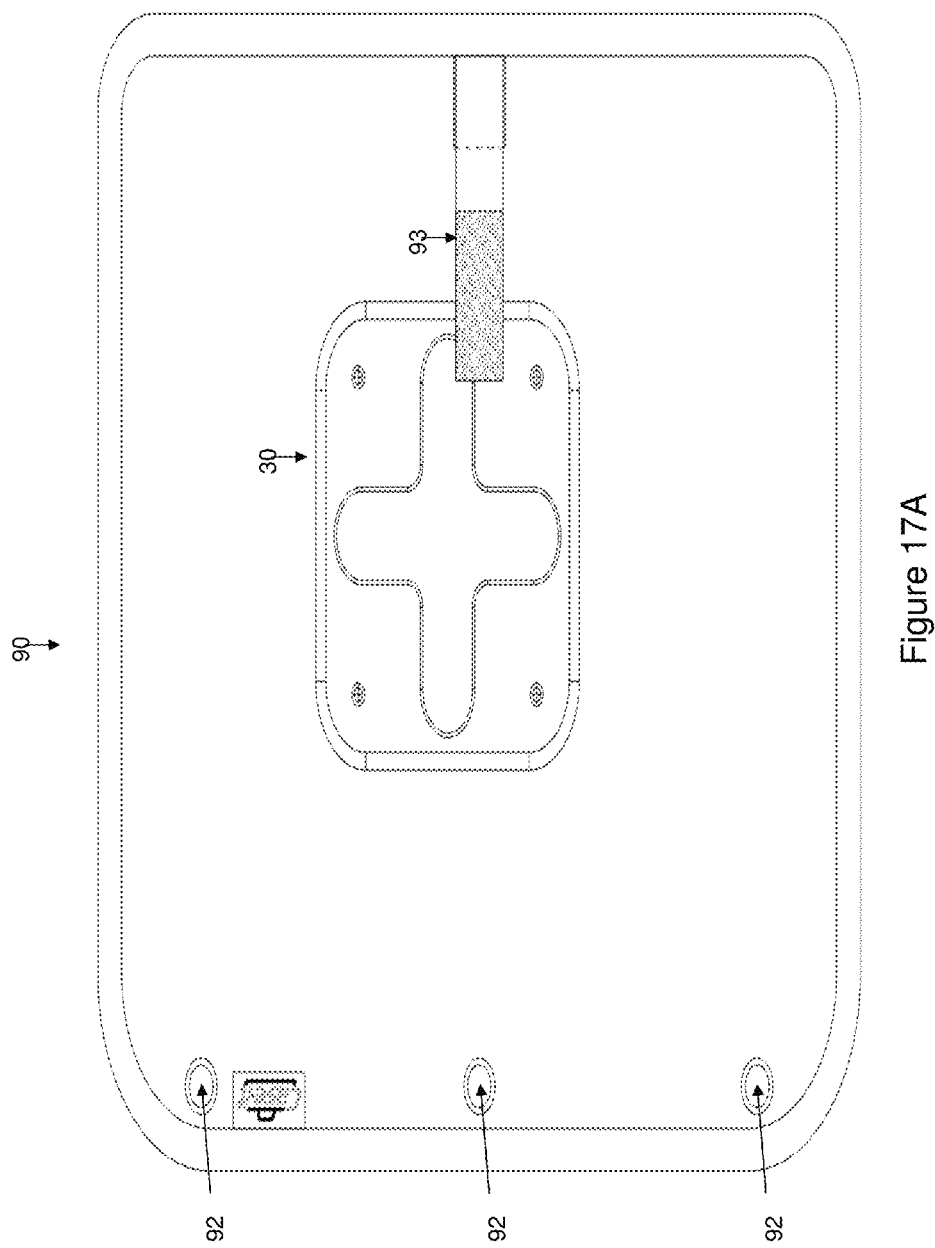

FIGS. 17A and 17B show a divider page 90 including a mounting plate 30 secured thereto. The divider page includes holes 92 extending therethrough along one edge thereof. The holes 92 are aligned with corresponding rings of a binder. The divider page may be inserted and secured within a binder by inserting the rings of the binder through the holes 92 of the divider page 90. A base plate 10 retaining a handheld electronic device may be releasably secured to the mounting plate 30 of the divider page 90 and then inserted into a binder. The binder can then be used as a protective cover for the handheld electronic device or, when opened, as a flat surface on which the handheld electronic device may be used. The divider page 90 to which the mounting plate 30 is secured must have either a rigid section to which the mounting plate 30 is secured or be rigid throughout. This provides a secure surface to which the mounting plate 30 may be connected. The divider page 90 may also include a fastening device 93. When engaged with a corresponding fastener on a binder, the divider page 90 will be held in place within a binder and thereby further secured to the binder providing additional stability when using the handheld electronic device. An opposing side of the divider page 90 is shown in FIG. 17B. The divider page 90 is shown including pockets for storing of supplies. Shown in this figure are a first side pocket 94 and a second side pocket 96. The first and second side pockets 94 and 96 include means for closing the pocket to secure items placed therein. The first and second pockets show zippers for closing the pockets. However, zippers are shown for purposes of example and any device able to close the opening of a pocket may be used. A third pocket 98 is shown between the first and second pockets. The third pocket 98 includes a flap for closing the pocket and securing items placed therein. The arrangement and number of pockets is shown for purposes of example however, any arrangement and number of pockets may be included on the divider page.

Figure 18A:
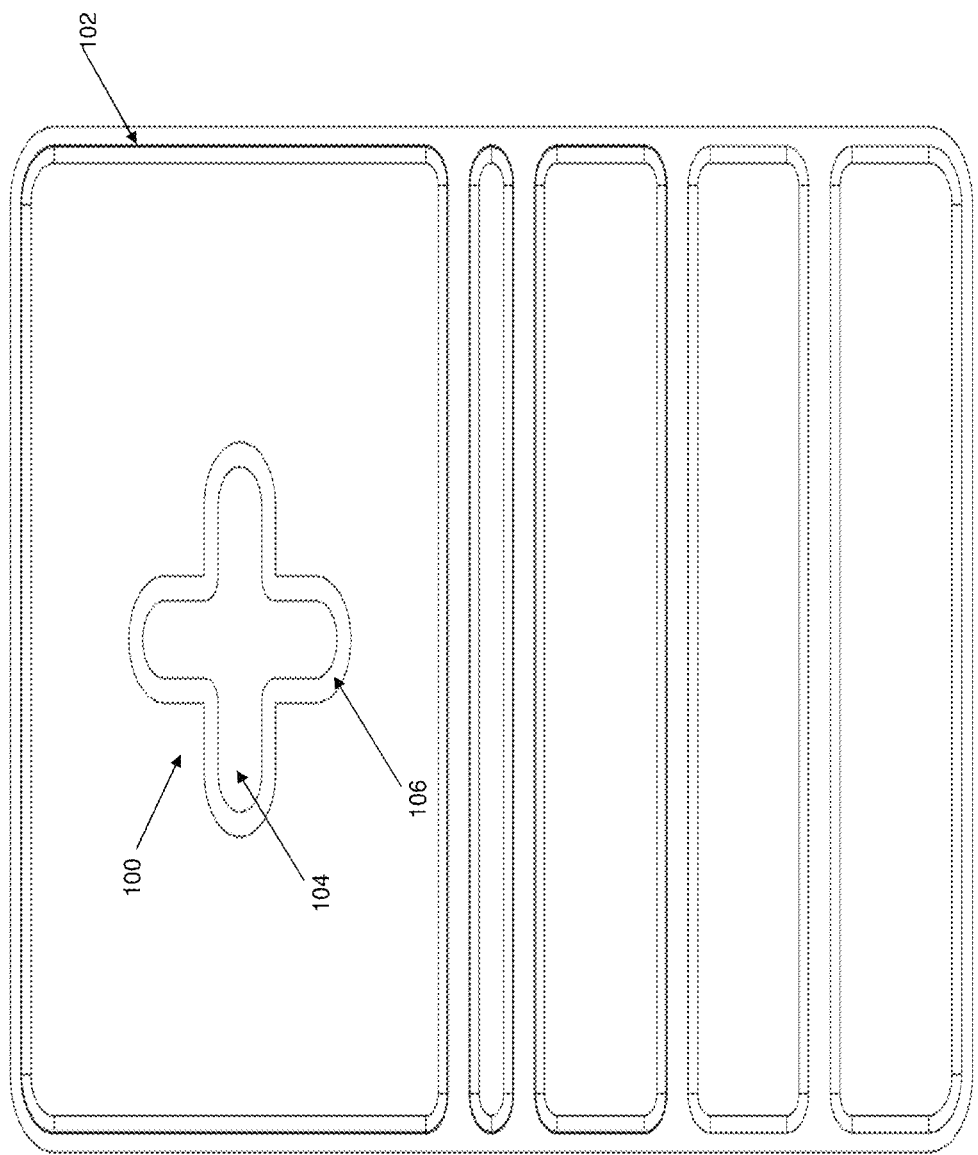
FIGS. 18A-18C are views of a cover including an alternate embodiment for the mounting plate according to invention principles.
Figure 18B:
Figure 18C:

FIGS. 18A-18C show an alternate embodiment for the mounting plate. In this embodiment, the mounting plate 100 is shown integrated within a protective cover 102. The protective cover is usually formed from a soft material that has limited rigidity. The mounting plate 100 forms a rigid section in at least one section of the protective cover and includes a female connector or recess 104 extending through the rigid section. Positioned around a periphery of the female connector or recess 104 may be a rigid member 106. The rigid member 106 provides additional support for retaining a connection with a male connector when engaged therewith. The rigid member 106 may be of shape having a top and bottom side spaced from one another and able to receive the edges of the cover 102 defining the recess 104 between the top and bottom sides. The sides of the cover 102 may fit snugly between the top and bottom sides or the rigid member 106 may be retained in position by crimping the top and bottom sides to the cover 102 or alternatively securing the rigid member to the cover 102. Positioned on the rigid member 106 and spaced around the female connector or recess 104 may be dimples and/or protrusions for mating with protrusions and/or dimples on the male connector as discussed with respect to FIGS. 4-8. The dimples and/or protrusions should be aligned with corresponding protrusions and/or dimples on the male connector. Any combination of dimples and protrusions may be positioned around the recess 104 for mating with corresponding dimples and/or protrusions positioned around the male connector. The dimples and/or protrusions may be positioned on either side of the rigid section thereby allowing the base plate and handheld device retained thereby to be connected to and secured in place on either side of the protective cover 102. FIGS. 18B and 18C show a top and side view of the protective cover 102, respectively. The protective cover shown is similar to the protective cover shown in FIGS. 10-13. However, the protective cover may take any form able to have the mounting plate integrally formed therewith and receive a base plate able to retain a handheld electronic device as described herein.

Figure 19A:
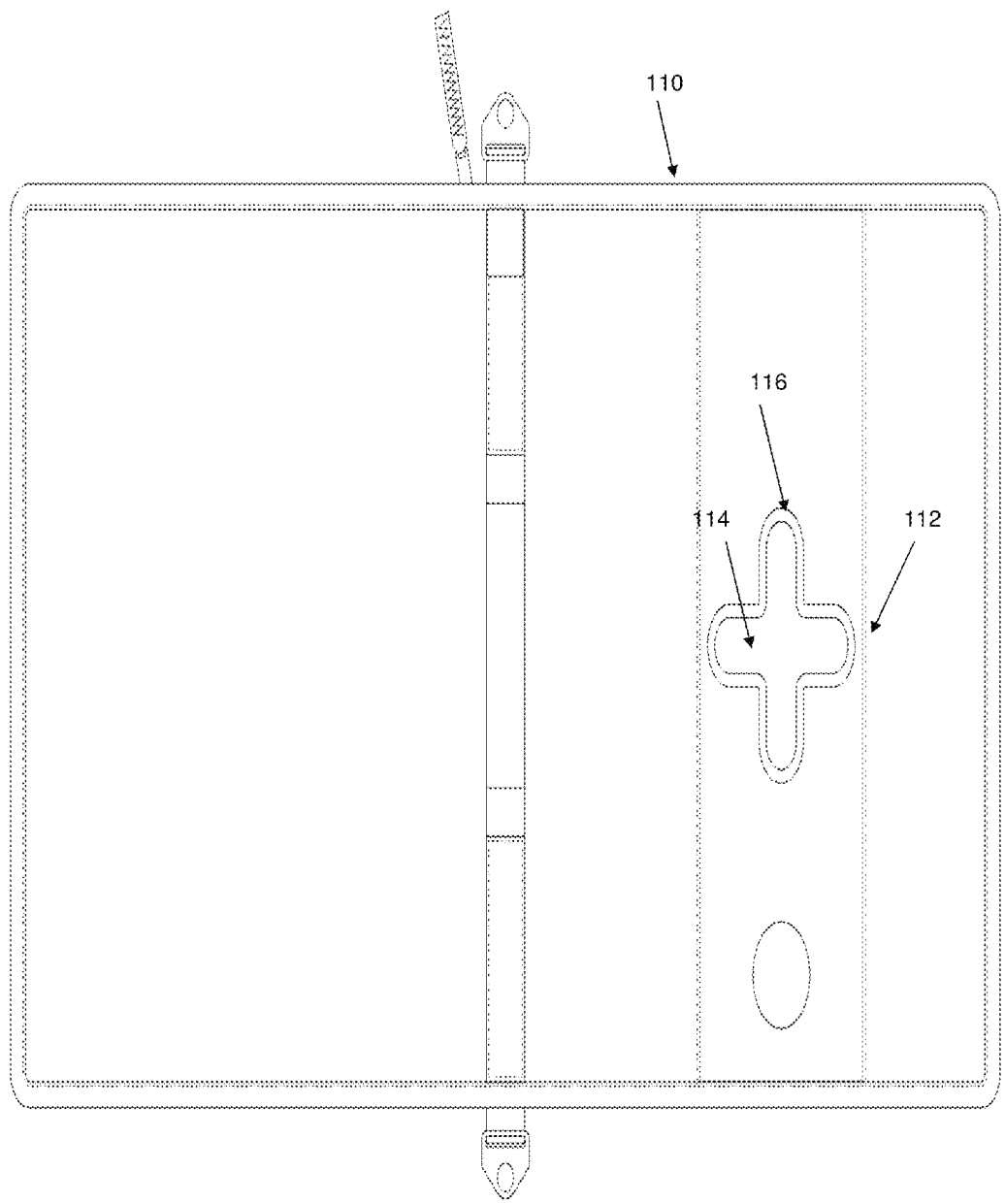
FIGS. 19A-19F are views of a binder including an alternate embodiment for the mounting plate according to invention principles.
Figure 19B:
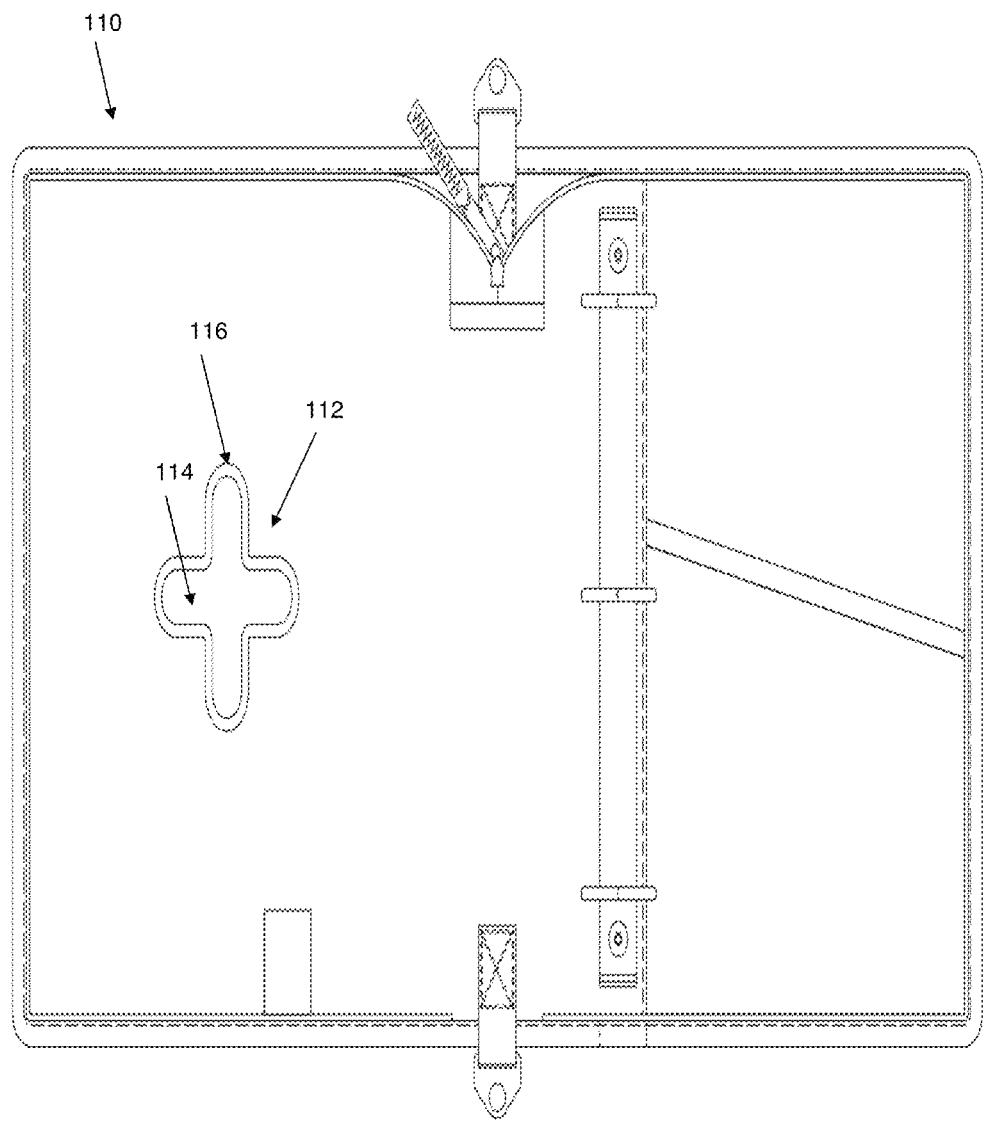
Figures 19C, 19D:
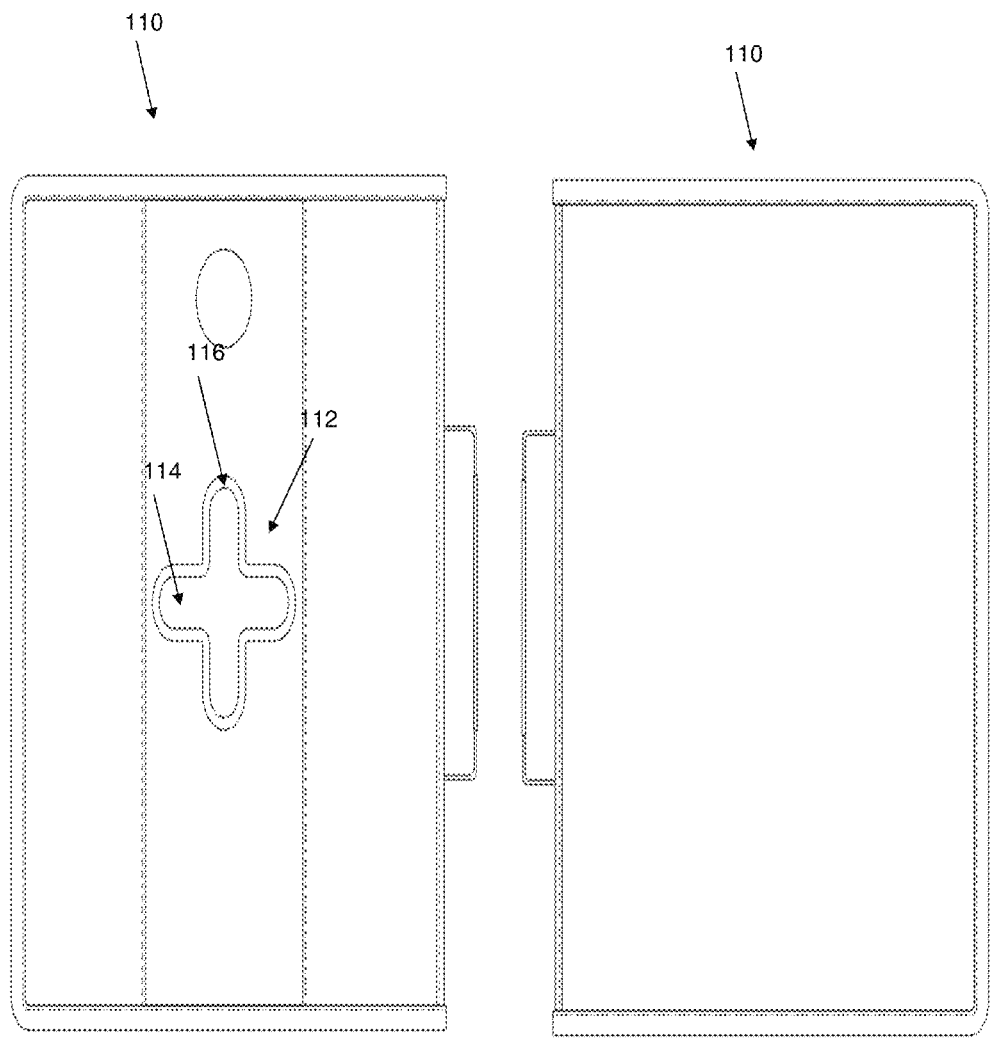
Figure 19E:
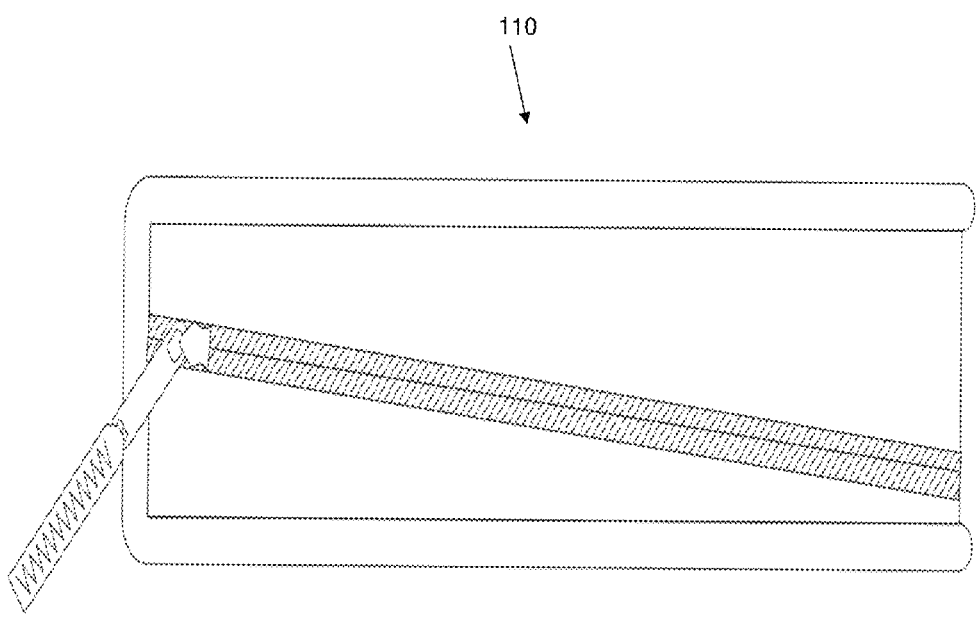
Figure 19F:
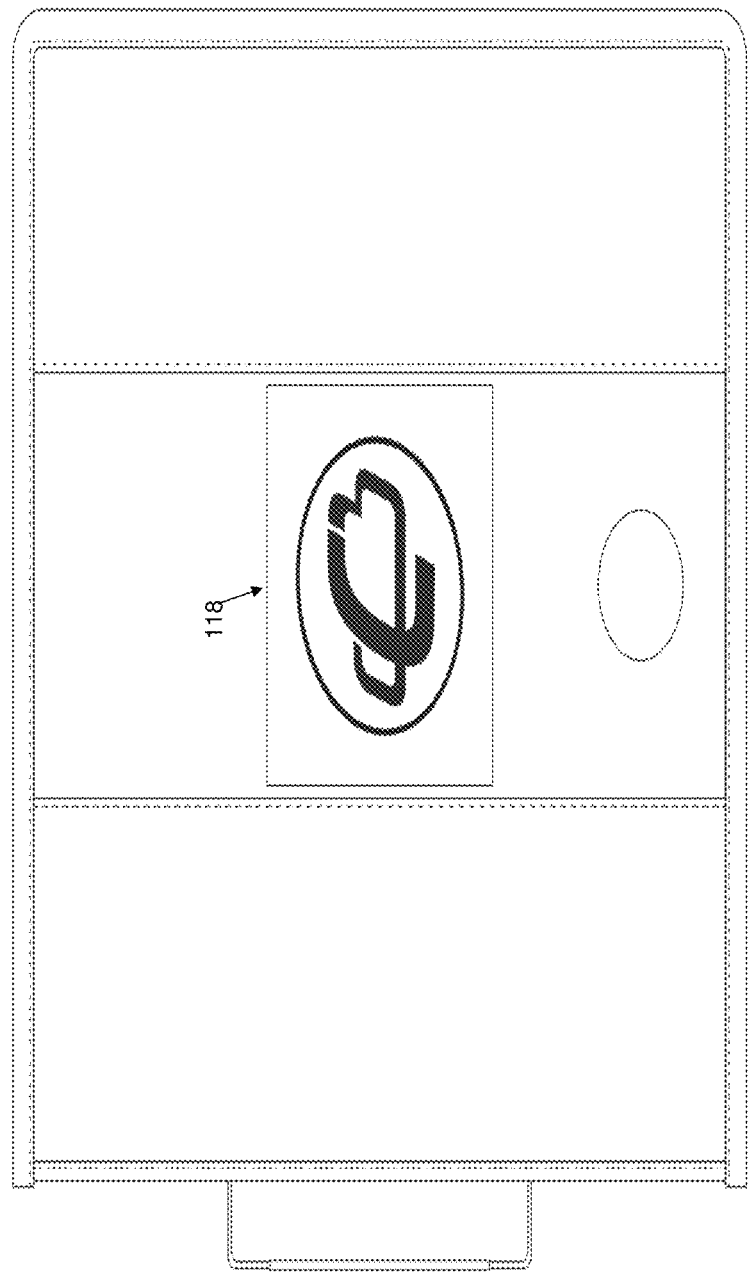

FIGS. 19A-19F show a binder 110 including a mounting plate 112 similar to that shown in FIGS. 18A-18C integrated within the binder 110. The binder 110 is formed from a material that has at least limited rigidity in the area of the mounting plate 112. The mounting plate 112 forms a rigid section in at least one section of the binder 110 and includes a female connector or recess 114 extending through the rigid section. Positioned around a periphery of the female connector or recess 114 may be a rigid member 116. The rigid member 116 provides additional support for retaining a connection with a male connector when engaged therewith. The rigid member 116 may be of shape having a top and bottom side spaced from one another and able to receive the edges of the periphery defining the recess 114 between the top and bottom sides of the binder cover. The edges of the periphery defining the recess 114 may fit snugly between the top and bottom sides of the rigid member 116. The rigid member 116 may be retained in position by crimping the top and bottom sides around edges of the periphery defining the recess 114 or alternatively securing the rigid member 116 to the binder cover. Positioned on the rigid section 116 and spaced around the female connector or recess 114 may be dimples and/or protrusions for mating with protrusions and/or dimples on the male connector as discussed with respect to FIGS. 4-8. The dimples and/or protrusions should be aligned with corresponding protrusions and/or dimples on the male connector. Any combination of dimples and protrusions may be positioned around the recess 114 for mating with corresponding dimples and/or protrusions positioned around the male connector. The dimples and/or protrusions may be positioned on either side of the rigid section thereby allowing the base plate and handheld device retained thereby to be connected to and secured in place on either side of the binder 110. FIGS. 19B-19E show various views of the binder including the mounting plate 112 integrally formed therein. The binder 110 shown is similar to the binder shown in FIGS. 15 and 16. However, the binder may take any form able to have the mounting plate integrally formed therewith and receive a base plate able to retain a handheld electronic device as described herein. FIG. 19F shows a removable plug 118 which may cover the female connector or recess 114 of the mounting plate 112 when a base plate is not engaged with the female connector 114. The removable plug 118 may be a single element or a two piece element. If the removable plug is a single element, a back side of the removable plug would be able to engage the mounting plate 112 in the same manner as the male connector. If the removable plug is a two piece element, each piece will have a flat plate surface as shown in FIG. 19F and a protrusion on a back side thereof able to extend through the female connector or recess 114 of the mounting plate 112 and engage with the protrusion extending from the other of the two piece element.

Figure 20:
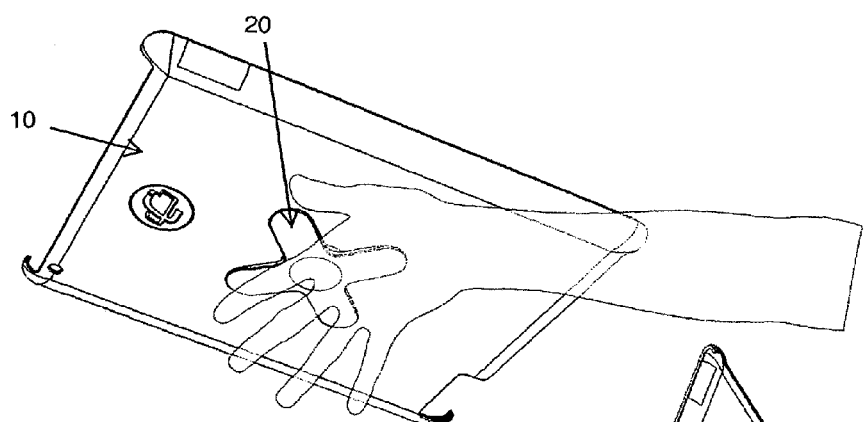
FIG. 20 is a view of a back side of the base plate according to invention principles showing gripping of the male connector with a hand.
Figure 21:
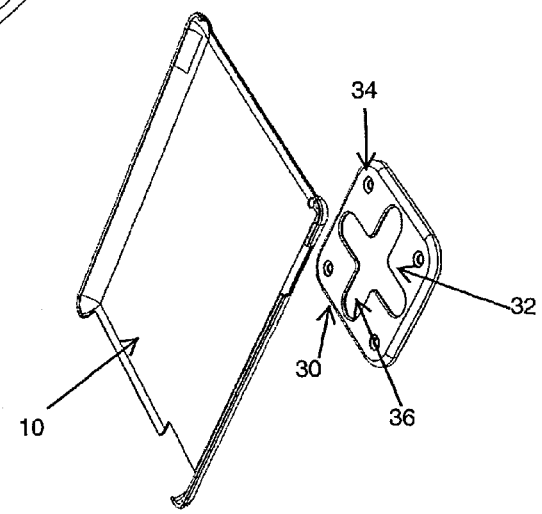
FIG. 21 shows positioning of an electronic computing device including the base plate when releasably securing the base plate to the mounting plate within a binder.

FIG. 20 shows the use of the male connector 20 on a base plate 10 as a handle for holding the base plate 10 and a handheld electronic device retained thereby. FIG. 21 shows a mounting plate 30 secured within a binder 70. In order to engage the base plate 10 with the mounting plate 30, the base plate 10 and handheld electronic device retained therein needs to be turned to align the male connector 20 with the recess 36 in the mounting plate 30. Once the male connector 20 is inserted through the recess 36 and into the space between the main section 34 and the cover of the binder 70 to which the mounting plate 30 is secured, the base plate 10 may be rotated so the handheld electronic device will be seated in an upright position within the binder 70. When the base plate 10 is rotated, the protrusions and/or dimples on the male connector 20 will engage with the dimples and/or protrusions on the underside of the main section 34 of the female connector 32 releasably securing the handheld electronic device in position within the binder 70. To disengage the base plate 10 from the mounting device, the base plate 10 is rotated to align the male connector with the recess 36 and the base plate 10 is lifted off of the mounting plate 30.

Figure 22A:
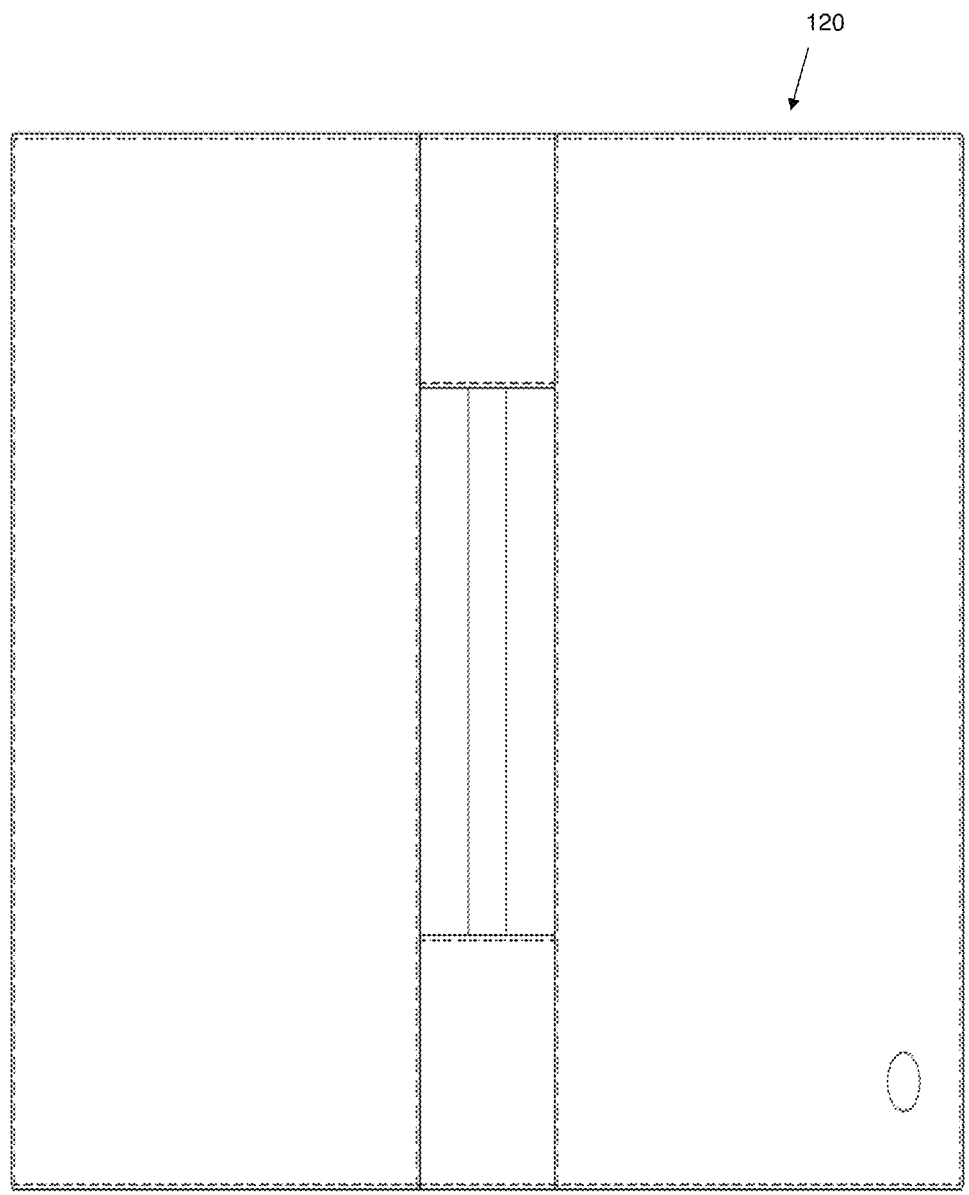
FIG. 22A-22E show a zippered padfolio with a removable 3-ring binder to which a mounting plate according to invention principles is connected.
Figure 22B:
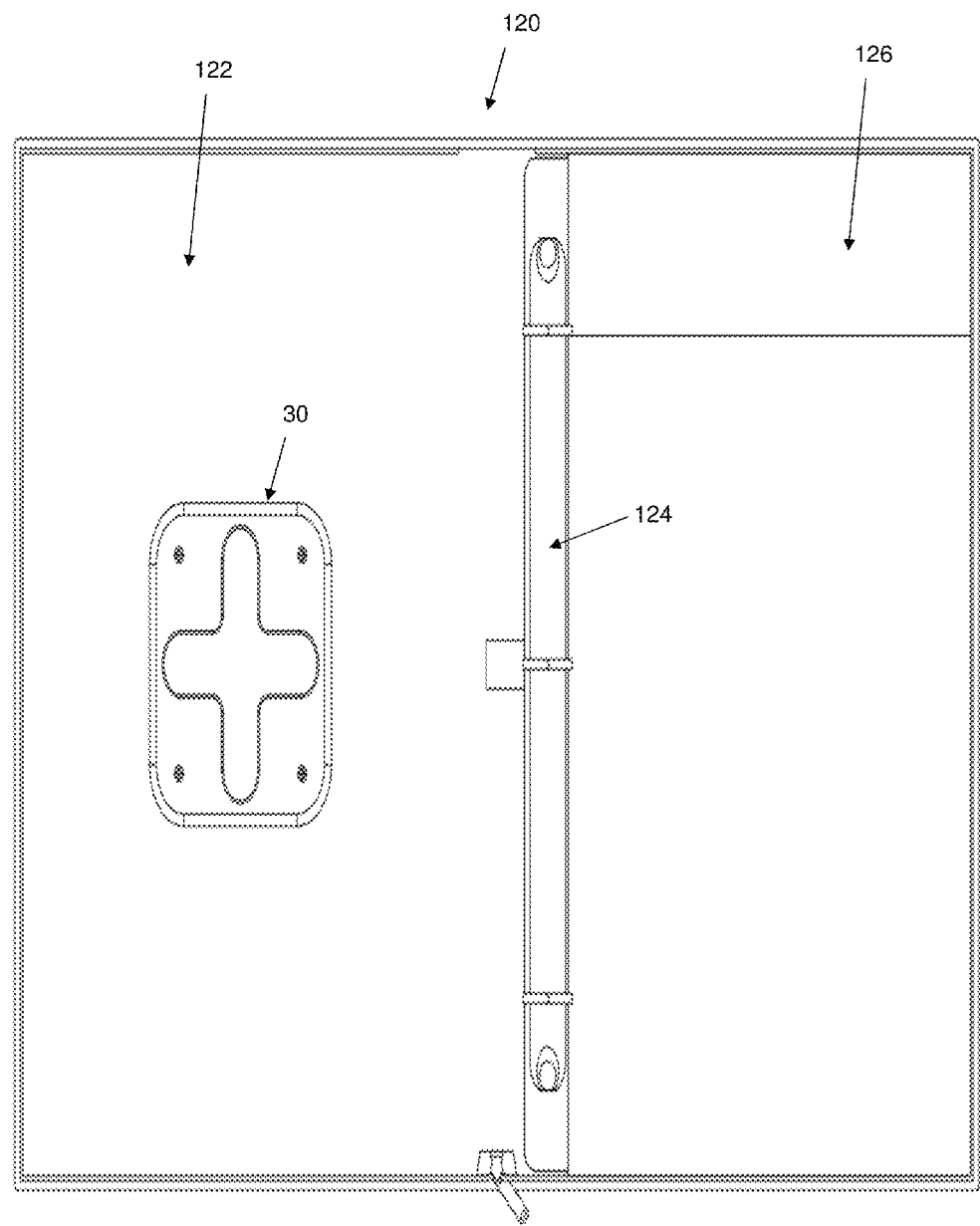
Figure 22C:
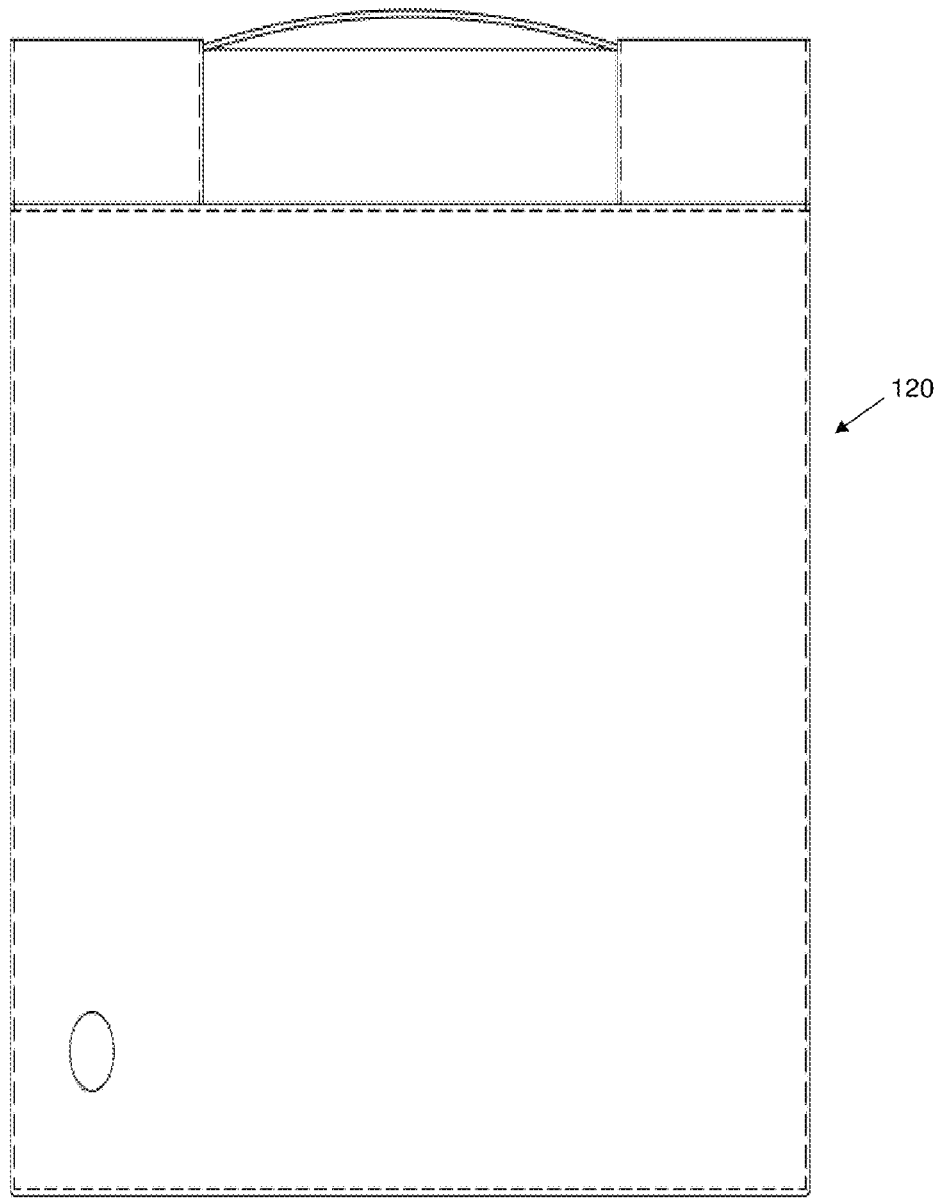
Figure 22D:
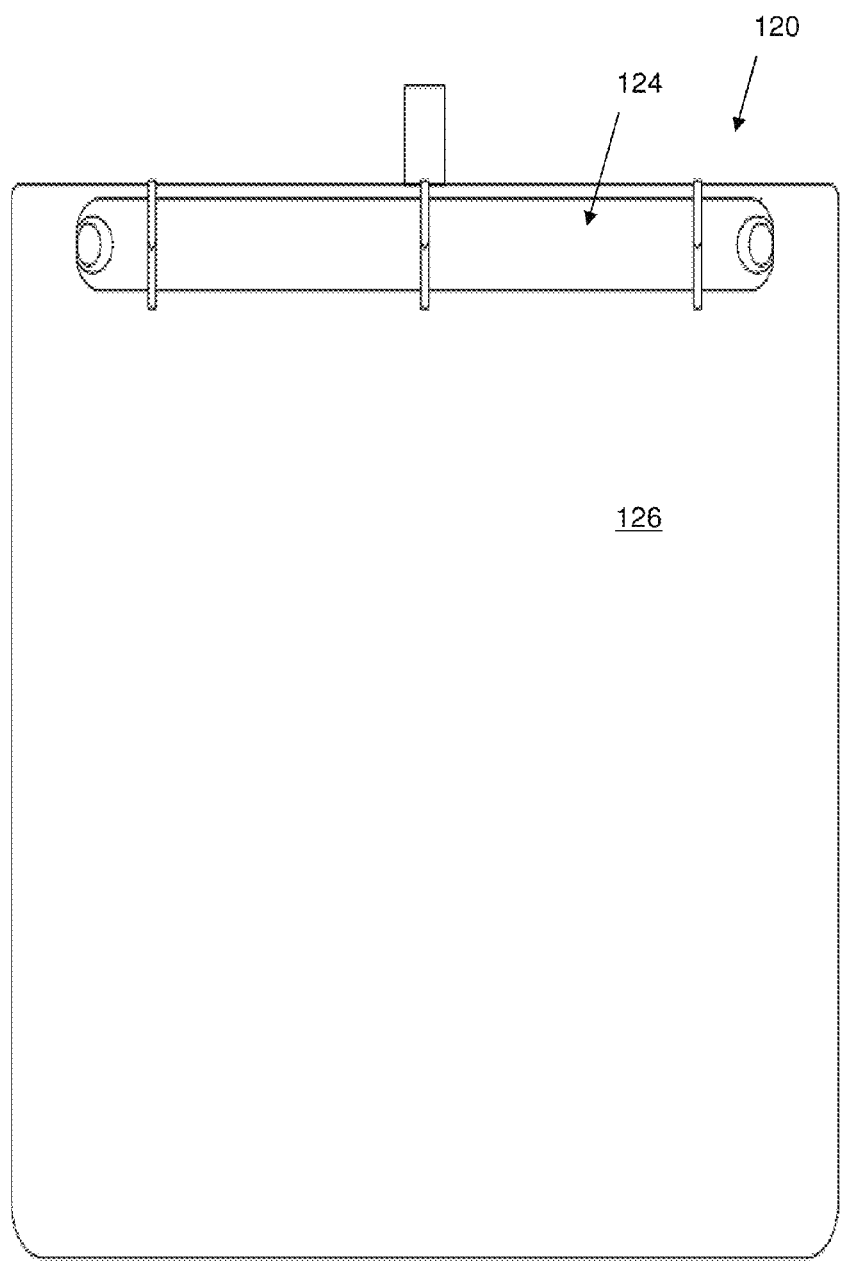
Figure 22E:
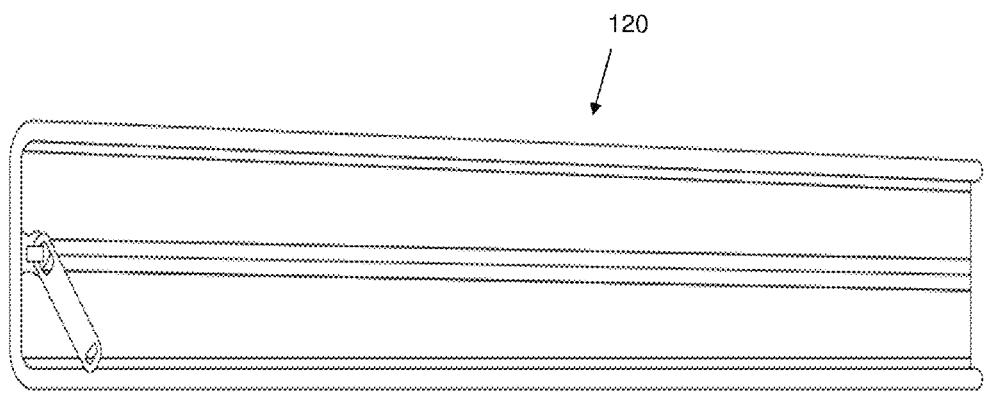

FIGS. 22A-22E show a zippered padfolio 120. The padfolio includes a removable 3-ring binder including a mounting plate secured thereto. An outside of the padfolio 120 is shown in an open position exposing the front and back covers in FIG. 22A and the inside of the front and back cover is shown in FIG. 22B. A mounting plate 30 is secured to one side cover 122 of the padfolio 120 and a binder clip 124 is positioned on the other side cover 126. Positioning of the binder clip 124 on the other side cover 126 from the side to which the mounting plate 30 is secured allows for positioning a base plate and handheld electronic device on a side cover without obstruction from the binder clips or documents retained on the binder clips. The binder clips of the zippered padfolio may include three rings therein for receiving items such as but not limited to looseleaf paper, page dividers or a hold down page as discussed above. FIG. 22C shows an outer front side of the zippered padfolio in a closed position. FIG. 22D shows an inside cover of the zippered padfolio including the binder clips. FIG. 22E shows a side view of the zippered padfolio in a closed position. A base plate securing a handheld electronic device may be secured to the mounting plate of the zippered padfolio. The zippered padfolio can then be used, when closed as shown in FIG. 22E as a protective cover for the handheld electronic device or, when opened, as a flat surface on which the handheld electronic device may be used.

Figure 23A:
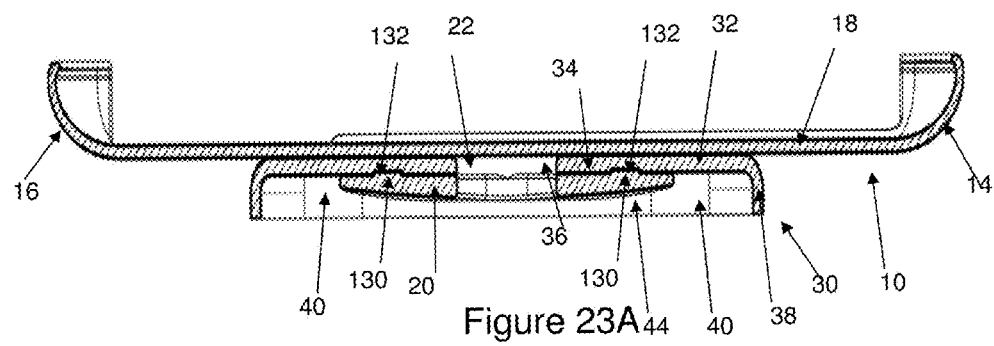
FIGS. 23A-23D show a cross sectional perspective view of the mounting plate and base plate engaged according to invention principles.
Figure 23B:
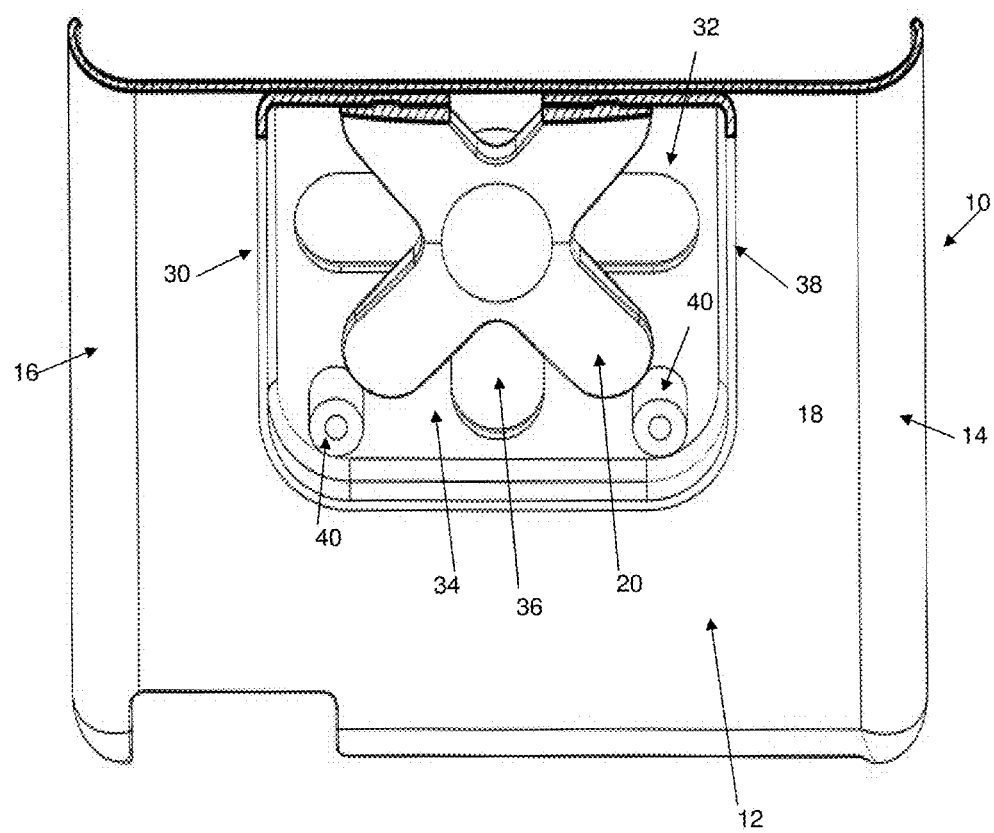

FIGS. 23A-23D show cross sectional views of the mounting plate 30 engaged with the base plate 10. FIGS. 23A and 23B show an embodiment in which protrusions 130 extending from the male connector 20 of the base plate 10 engage dimples 132 within the mounting plate 30. The base plate 10 is positioned on top of and engaged with the mounting plate 30. The male connector 20 is shown on an underside of the recess 36 and offset from the recess 36. The separator 22 secures the male connector 20 at a distance from the base plate 10 great enough to allow the male connector 20 to be seated in the space 44 between the main section 34 of the mounting plate 30 and the surface to which the mounting plate 30 is secured. When the male connector 20 is aligned with the recess 36 it is able to pass therethrough. Once inserted, the male connector 20 is rotated to be offset from the recess 36 whereby the protrusions 130 extending from an underside of the male connector 20 engage the dimples 132 on the underside of the mounting plate 30. The back side of the base plate 10 is shown seated against a top side of the mounting plate 30.

Figure 23C:
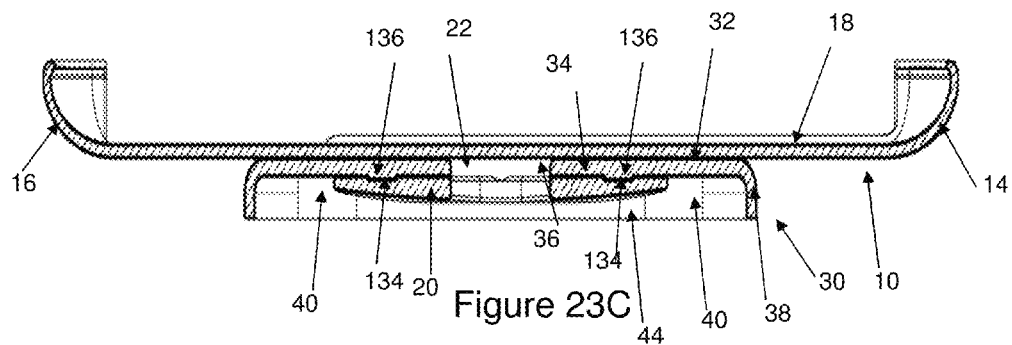
Figure 23D:
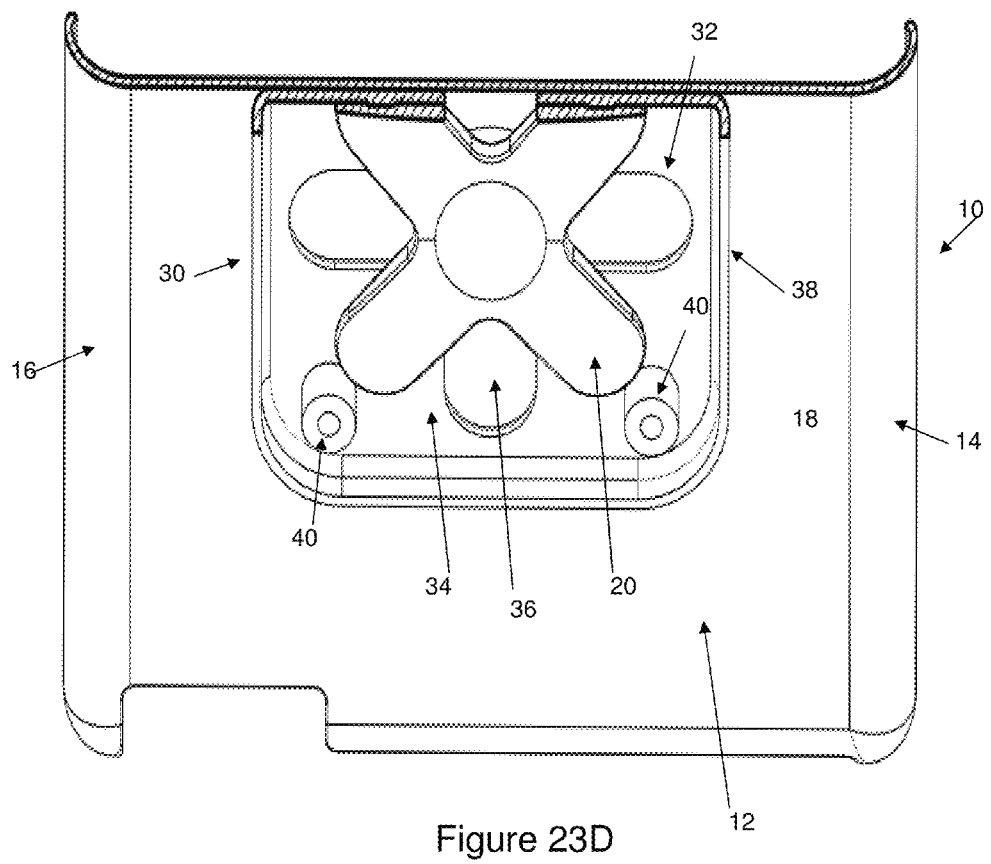

FIGS. 23C and 23D show an embodiment in which protrusions 136 extending from the mounting plate 30 engage dimples 134 within the male connector 20 of the base plate 10. The base plate 10 is positioned on top of and engaged with the mounting plate 30. The male connector 20 is shown on an underside of the recess 36 and offset from the recess 36. The separator 22 secures the male connector 20 at a distance from the base plate 10 great enough to allow the male connector 20 to be seated in the space 44 between the main section 34 of the mounting plate 30 and the surface to which the mounting plate 30 is secured. When the male connector 20 is aligned with the recess 36 it is able to pass therethrough. Once inserted, the male connector 20 is rotated to be offset from the recess 36 whereby the protrusions 136 extending from an underside of the mounting plate 30 engage the dimples 132 on the underside of the male connector 20. The back side of the base plate 10 is shown seated against a top side of the mounting plate 30.

FIGS. 24A and 24B show cross sectional views of the alternate embodiment of the female connector shown and described with respect to FIGS. 18 and 19. From these figures the recess 104 of the female connector 100 is shown formed in a surface 102 with the rigid member 106 extending around a periphery of the recess 104. The rigid member is shown having a U-shape including a top side 140 and a bottom side 142 spaced from one another by a midsection 144. The rigid member 106 is able to receive the edges of the surface 102 defining the recess 104 between the top side 140 and bottom side 142. The sides of the surface may fit snugly between the top side 140 and bottom side 142 or the rigid member 106 may be retained in position by crimping the top side 140 and bottom side 142 to the surface or alternatively securing the rigid member 106 to the surface 102. Positioned on and spaced around the recess 104 of the female connector 100 may be dimples and/or protrusions for mating with protrusions and/or dimples on the male connector. The dimples and/or protrusions on the female connector 100 should be aligned with corresponding protrusions and/or dimples on the male connector. The dimples and/or protrusions may be positioned on either side of the rigid section thereby allowing the base plate and handheld device retained thereby to be connected to and secured in place on either side of the surface. There may be any number and arrangement of the dimples and/or protrusions on the female connector as long as the dimples and/or protrusions correspond with protrusions and/or dimples on the male connector.

Figure 25:
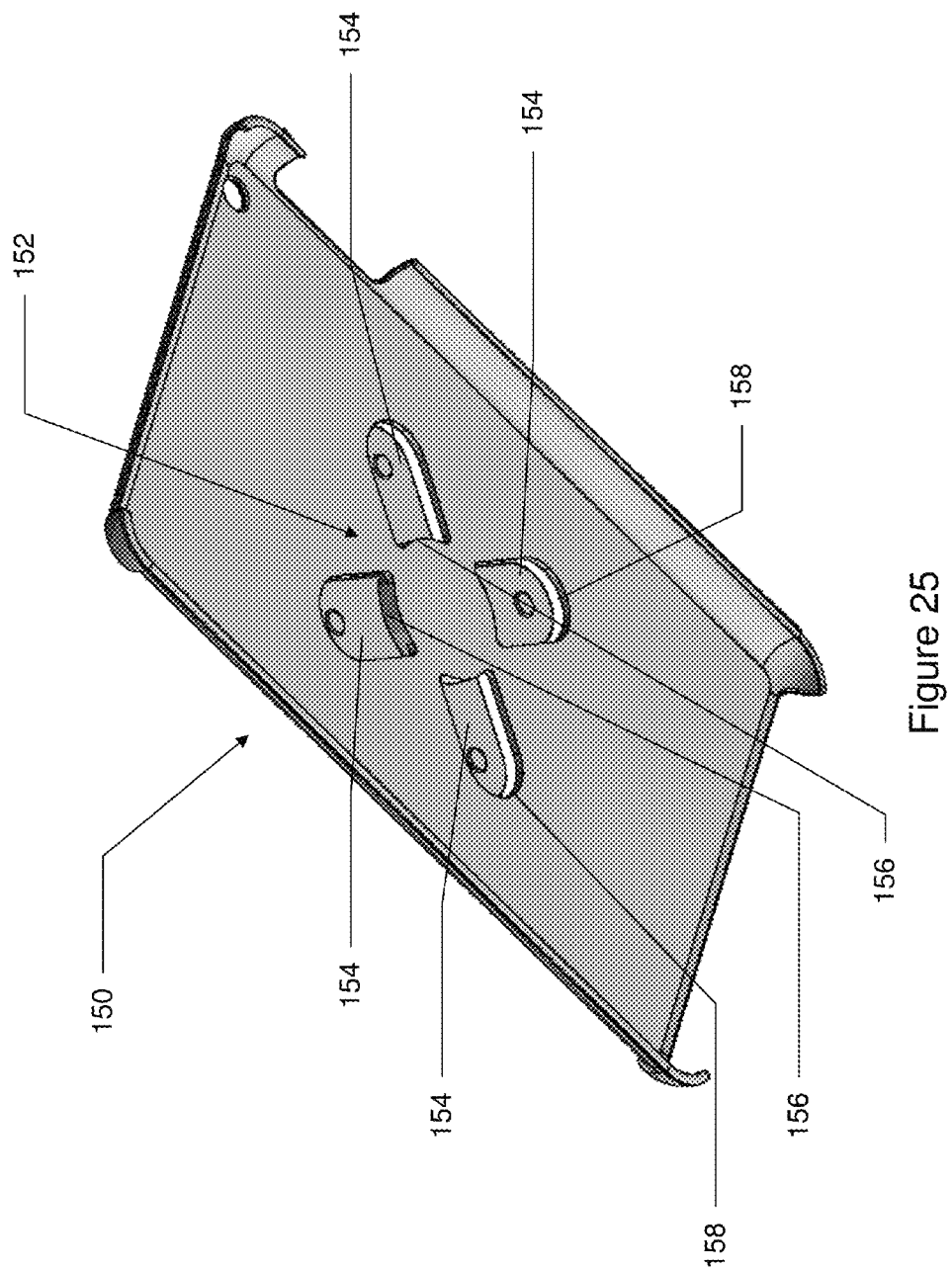
FIG. 25 shows an alternate embodiment for the male connector on the base plate according to invention principles.

FIG. 25 shows an alternate embodiment for the male connector 152 on the base plate 150. The male connector is shown including four members 154 each extending from a central point to form an "X" or alternately a "+". Each of the members 154 are connected to the base plate 150 at a first end by a spacer unit 156 and include an extension arm 158 extending, from its respective spacer unit 156, parallel to and spaced from the base unit 150. The members 154 operate similarly to the one piece male connector shown in FIGS. 1 and 2. When the base plate 150 is positioned against a mounting plate 30 and the members 154 are aligned with the recess in the female member, the members are received within the space between the mounting plate 30 and the surface to which it is secured. Positioned on the members 154 are protrusions an/or dimples for mating with corresponding dimples and/or protrusions on the female unit.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist according to invention principles that others can, by applying current knowledge, readily adapt it for various applications without omitting features that, from the standpoint of prior art, fairly constitute essential characteristics of the generic aspects of this invention.

I claim:

1. A device for selectively and releasably mounting a handheld electronic device to a surface, said device comprising:
   a binder including a first surface having a recess extending therethrough and a rigid member having a top side, a bottom side and a midsection connecting the top side and bottom side, the rigid member having a similar shape to and extending around and engaging a periphery of the recess, the rigid member receiving the first surface between the top side and bottom side thereof;
   a base plate for receiving the handheld electronic device within a first side thereof and including a male connector spaced and extending from a side of the base plate opposite the first side, and the male connector having a size and shape similar to the size and shape of the recess wherein, insertion of the male connector through the rigid member and rotation of the male connector to be misaligned with the recess causes the base plate and handheld electronic device to be releasably locked to the first surface of the binder.

2. The device of claim 1, wherein said male connector includes protrusions extending therefrom and the bottom side of the rigid member includes dimples spaced in alignment with the protrusions extending from the male connector for receiving the protrusions when the male connector is inserted through the rigid member and rotated.

3. The device of claim 2, wherein the midsection has a width substantially equal a thickness of the first surface and the top side and bottom side are crimped to the first surface securing the rigid member to the first surface.

4. The device of claim 1, wherein said male connector includes dimples positioned thereon and the bottom side of the rigid member includes protrusions extending therefrom and spaced in alignment with the dimples on the male connector, wherein the protrusions are received within the dimples when the male connector is inserted through the rigid member and rotated.

5. The device of claim 4, wherein the midsection has a width substantially equal a thickness of the first surface and the top side and bottom side are crimped to the first surface securing the rigid member to the first surface.

* * * * *